(12) United States Patent
Sevindik et al.

(10) Patent No.: US 11,496,957 B2
(45) Date of Patent: Nov. 8, 2022

(54) SERVICE PROFILE IDENTIFIER (SPID) BASED NETWORK TRANSITION TECHNIQUE WITH USER EQUIPMENT (UE) REPORTING

(71) Applicant: Charter Communications Operating, LLC, St. Louis, MO (US)

(72) Inventors: Volkan Sevindik, Parker, CO (US); Haider Syed, Parker, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 20 days.

(21) Appl. No.: 17/140,067

(22) Filed: Jan. 2, 2021

(65) Prior Publication Data

US 2022/0217623 A1 Jul. 7, 2022

(51) Int. Cl.
| | | |
|---|---|---|
| *H04W 48/18* | (2009.01) |
| *H04W 8/18* | (2009.01) |
| *H04W 8/04* | (2009.01) |
| *H04W 88/08* | (2009.01) |
| *H04W 60/04* | (2009.01) |
| *H04W 24/10* | (2009.01) |
| *H04W 84/04* | (2009.01) |
| *H04W 92/20* | (2009.01) |

(52) U.S. Cl.
CPC ............ *H04W 48/18* (2013.01); *H04W 8/04* (2013.01); *H04W 8/18* (2013.01); *H04W 24/10* (2013.01); *H04W 60/04* (2013.01); *H04W 88/08* (2013.01); *H04W 84/042* (2013.01); *H04W 92/20* (2013.01)

(58) Field of Classification Search
CPC ......... H04W 48/18; H04W 8/04; H04W 8/18; H04W 24/10; H04W 60/04; H04W 88/08; H04W 84/042; H04W 92/20
See application file for complete search history.

(56) References Cited

U.S. PATENT DOCUMENTS

| | | | | |
|---|---|---|---|---|
| 2004/0162058 A1* | 8/2004 | Mottes | ................ | H04M 15/765 455/411 |
| 2007/0197228 A1* | 8/2007 | McGary | ................ | H04M 15/50 455/445 |

* cited by examiner

*Primary Examiner* — Marcus Hammonds
(74) *Attorney, Agent, or Firm* — Straub & Straub; Michael P. Straub; Stephen T. Straub

(57) ABSTRACT

A mobile network operator (MNO) base station, e.g., an eNB, instructs a mobile virtual network operator (MVNO) user equipment (UE) to monitor to detect signals from base stations in its MVNO network and to report back the results. If the UE reports to the MNO base station, that it has detected signals from base stations, e.g. CBSDs, in its MVNO, the MNO base station applies one or more rules included in a stored Service Profile Identifier, corresponding to the UE, the applying of the one or more rules causes the MNO base station to disconnect or deny service to the UE. Alternatively, when it is determined that the UE did not detect a signal from a base station, e.g. a CBSD, in its MVNO, then the MNO base station provides communications service to the UE.

20 Claims, 16 Drawing Sheets

SERVICE PROFILE IDENTIFIER (SPID) BASED NETWORK TRANSITION TECHNIQUE WITH USER EQUIPMENT (UE) REPORTING

FIELD

The present invention relates to wireless communications systems including a mobile network operator (MNO) network and a mobile virtual network operator (MVNO) network, and more particularly, to methods and apparatus for controlling MVNO user equipments (UEs), to use and remain attached to the MVNO network, e.g., as much as possible.

BACKGROUND

MVNO (Mobile Virtual Network Operator) servicer providers often use network devices which they own or control to provide services to customers with one or more partner networks (MNO partner networks) being used to supplement the coverage available from the MVNO's own network or devices. For cost reasons it can be desirable to avoid or limit the use of MNO partner networks but the amount of control over a partner's network is often limited.

Citizens Broadband Radio Service (CBRS) is a 150 MHz wide broadcast band of the 3.5 GHz band (3550 MHz to 3700 MHz) in the United States. The CBRS band has been designated for sharing among three tiers of users: incumbent users, priority licensees and generally authorized. The CBRS band can be used at relatively low cost compared to other frequency bands since users need not buy an exclusive license to use the band. Given the cost advantages of using CBRS, but its potential lack of availability or reliability, it can be desirable to use CBRS in combination with services provided by a cellular operator with cellular services being relied upon in areas where CBRS service is unavailable.

While cellular operators are often willing to partner with other operators, they normally like to maintain control over their networks. While cellular operators are often willing to provide service on a contractual basis to customers of other networks, for security and other reasons cellular service providers normally do not like to provide other service providers insight into their customers and/or direct control over distribution of service profile information in their network. Service profile information is often used to control what services are provided to individual devices within a cellular provider's network.

While operators of CBRS based networks can provide service to customers in a cost competitive manner, customers may experience brief drops in CBRS coverage when a mobile communications device changes direction, e.g., because a vehicle in which the device is located turns or changes direction, or a mobile device briefly passes behind an obstruction such as a building. In many cases such movement can cause a brief coverage outage, e.g., lasting 10 seconds or less in some cases, a mobile communications device which can receive service via a cellular network as a backup may connect to Such loss of connectivity may in many cases trigger a UE to connect to a cellular base station. Once connected to a cellular base station the connection with the cellular base station may remain good for an extended period of time. The good connection can discourage a UE from switching back to the MVNO's network with the UE remaining on the cellular service for a lengthy period of time even though the UE may be near a base station corresponding to the MVNO's network and could have switched the MVNO's network.

It would be desirable if methods and/or apparatus could be developed which would allow user equipments (UEs) receiving service from MVNO networks to avoid connecting with and remaining connected to a cellular base station for extended periods of time in areas where a loss of connectivity to a MVNO network device is likely to be short term, e.g., because the UE is moving through an area in which the MVNO network devices provide coverage.

SUMMARY

In various embodiments a first MVNO service provider provides service to UE devices, e.g., cell phone and mobile data devices including cars for example. The service is provided in some embodiments using one or more CBRS devices, e.g., base stations which use CBRS spectrum to provide wireless communications services. The first MVNO service provider partners in some embodiments with a first MNO partner, e.g., another wireless service provider such as a cellular network service provider which provides service via the use of licensed spectrum.

In some embodiments a management device, e.g., HSS (Home Subscriber Service) device, in the MVNO service provider network provides international mobile subscriber identity (IMSI) values which are used to identify devices of subscribers to service provided by the first MVNO operator to a service management device, e.g., a HSS device in the MNO partner network. In this way the MVNO service provider identifies customer devices which are to be provided service based on an agreement between the MVNO service provider e.g., who operates a CBRS network in some embodiments, and an MNO service provider, e.g., who in some embodiments is a cellular network service provider who provides service via licensed spectrum.

In various embodiments the management device, e.g., HSS (Home Subscriber Service) device in the MNO network use the IMSI information to generate Service Profile Identifier (SPID) records for the customers of the MVNO. In accordance with one feature of the invention, the SPID records include one or more rules that are used to control base stations that use the SPID records to deny service, e.g., disconnect, customer devices which connect or attempt to connect to an MNO base station but which can still detect signals from a MVNO base station, e.g., CBSD base station corresponding to the MVNO. In this way, the SPID record corresponding to the MVNO can be used to prevent connection to the MNO partner, e.g., cellular provider, base station in cases where the inability to communicate with a MVNO is likely to be transient, e.g., a few second in duration, as indicated by the UEs ability to detect signals from the MVNO base station. When a UE fails to detect signals from the MVNO's base station, the MNO base station will allow the UE to connect and remain connected to the MNO base station. This is accomplished by the MNO base station implementing the SPID rules corresponding to the UE in cases where the UE detects a signal from an MVNO network and reports the signal to the MNO base station but not in cases where the UE does not detect and report a signal from an MVNO base station, e.g., CBRS base station.

To facilitate the signal detection based decision to use a SPID record corresponding to the MVNO or to provide service to the UE based on another record or a default set of rules, a MNO base station identifies UEs corresponding to the MVNO system, e.g., based on their IMSIs, and requests that they monitor to detect RF signals and report detected RF signal information prior to deciding whether or not to apply the SPID rules including the disconnect/do not provide service rule, to the UE's connection. Thus, a MNO partner base station in some embodiments request signal monitoring and measurements from MVNO devices before deciding what connection/service rules to apply but does not make the same signal measurement request of other devices, e.g., UE devices which are direct subscribers to one or more services provided by the MNO partner rather than the MVNO service provider.

An exemplary communications method, in accordance with some embodiments, comprises: operating a first Mobile Network Operator (MNO) base station (e.g., a first eNB) to instruct, a first user equipment UE which receives services from a first Mobile Virtual Network operator (MVNO) network to monitor to detect signals transmitted by base stations; determining, at the first MNO base station, from RF signal information received from the first UE, whether a signal from a base station in the first MVNO network was detected by the first UE; when it is determined that the first UE detected a signal from a base station in the first MVNO network, applying at the first MNO base station one or more rules included in a first Service Profile Identifier (SPID) record corresponding to the first UE, said applying of the one or more rules causing the first MNO base station to disconnect or deny service to the first UE; and when it is determined that the first UE did not detect a signal from a base station in the first MVNO network, providing communication service to the first UE via the first MNO base station.

While various features discussed in the summary are used in some embodiments it should be appreciated that not all features are required or necessary for all embodiments and the mention of features in the summary should in no way be interpreted as implying that the feature is necessary or critical for all embodiments.

Numerous aspects, features, and variations on the above described methods and apparatus are discussed in the detailed description which follows.

BRIEF DESCRIPTION OF THE FIGURES

FIG. 2 comprises the combination of FIG. 2A, FIG. 2B, FIG. 2C, FIG. 2D and FIG. 2E.

FIG. 7 comprises the combination of FIG. 7A and FIG. 7B.

DETAILED DESCRIPTION

Figure 1:
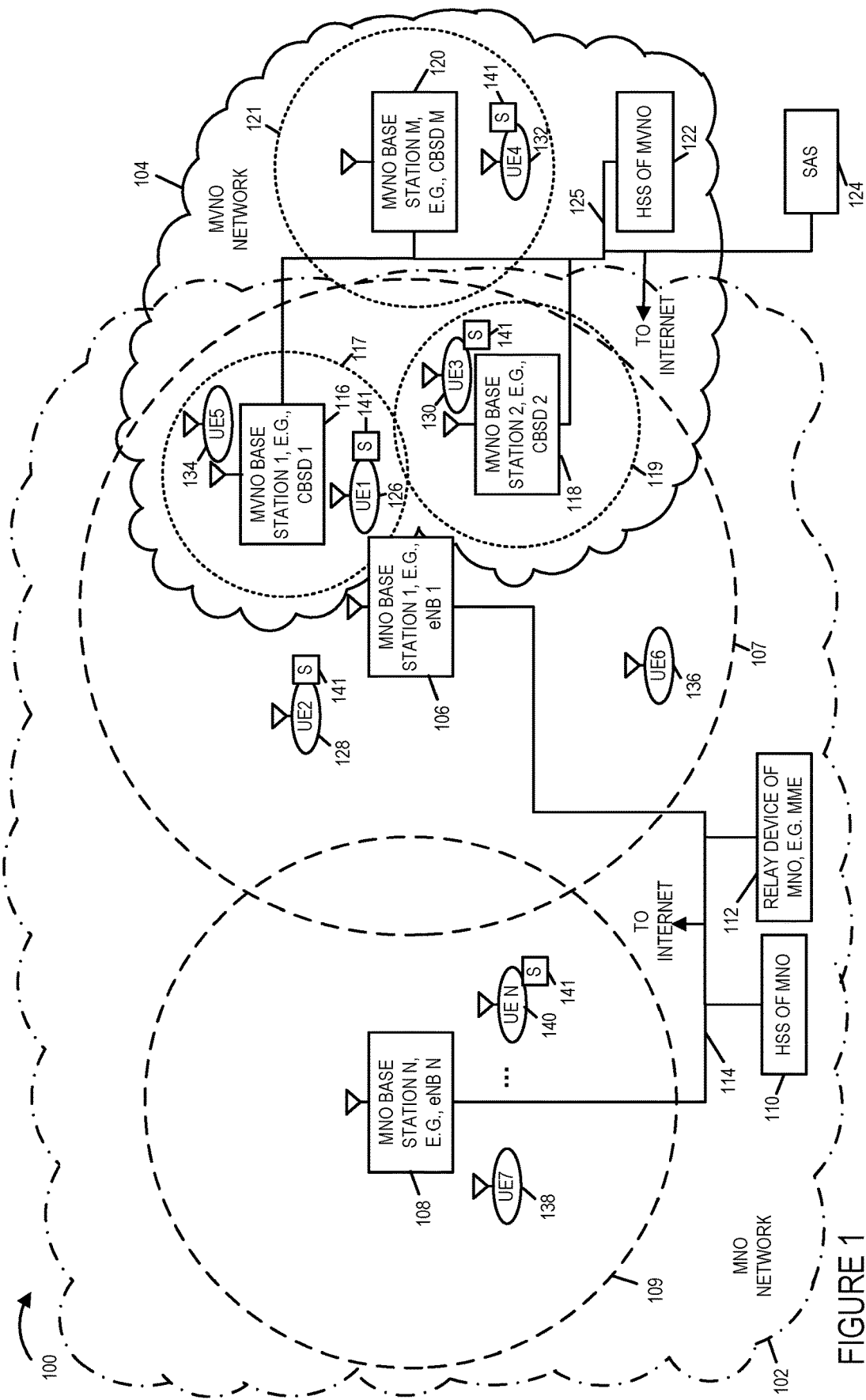
FIG. 1 is a drawing of an exemplary communications system in accordance with an exemplary embodiment, said exemplary communications system including a Mobile Network Operator (MNO) network and a Mobile Virtual Network Operator (MVNO) network, which are partner networks.
Figure 2A:
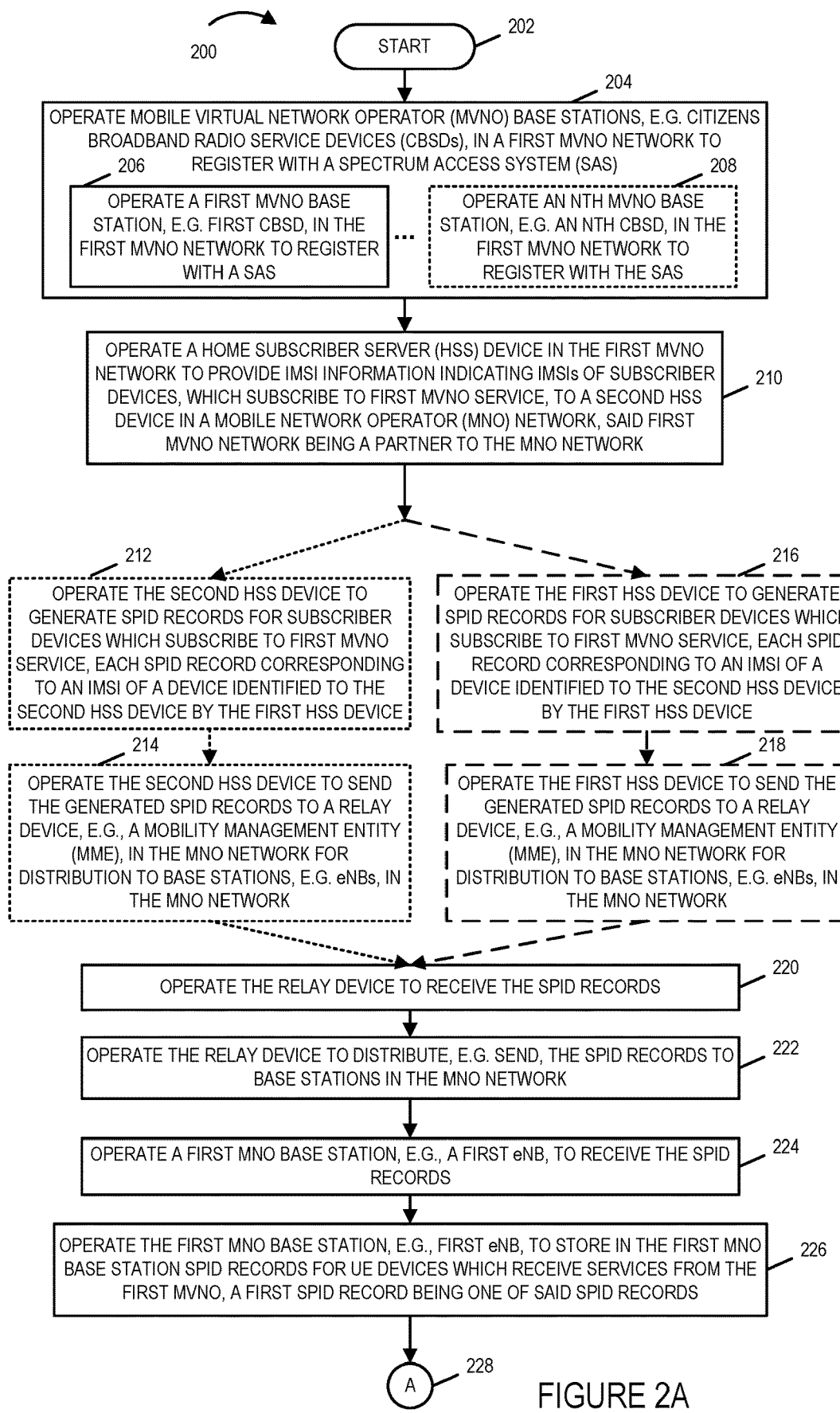
FIG. 2A is a first part of a flowchart of an exemplary method of operating a communications system in accordance with an exemplary embodiment.
Figure 2B:
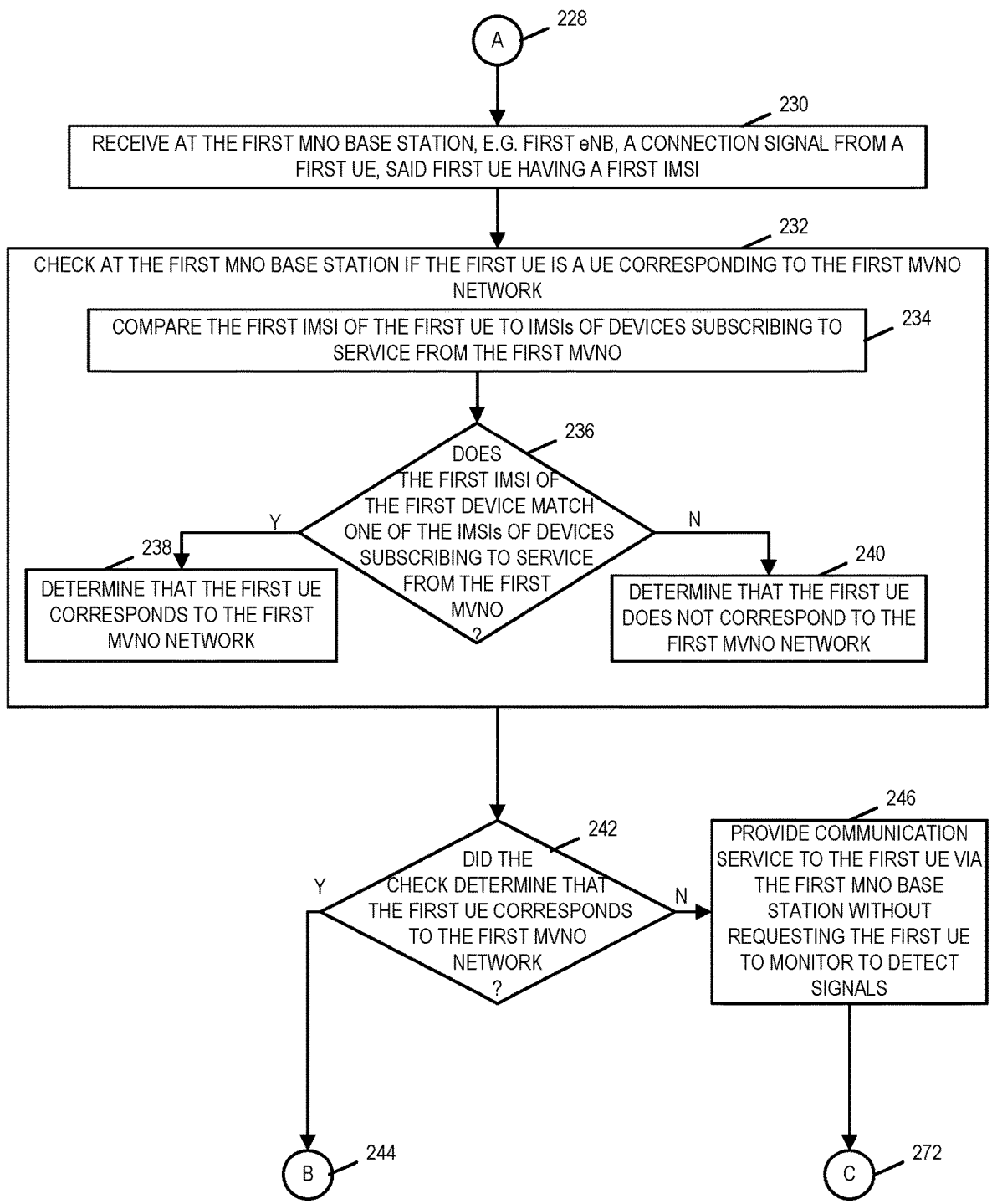
FIG. 2B is a second part of a flowchart of an exemplary method of operating a communications system in accordance with an exemplary embodiment.
Figure 2C:
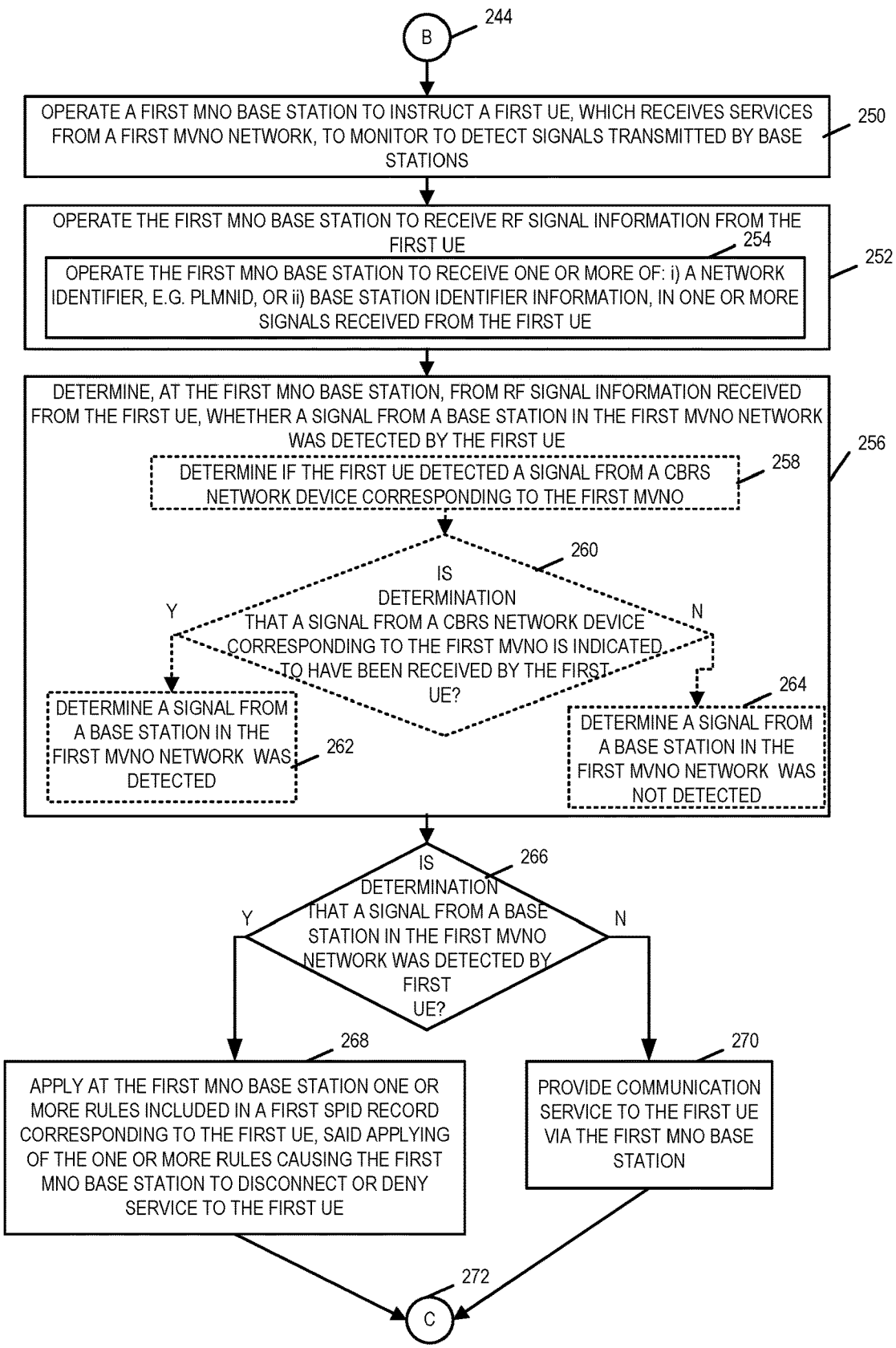
FIG. 2C is a third part of a flowchart of an exemplary method of operating a communications system in accordance with an exemplary embodiment.
Figure 2D:
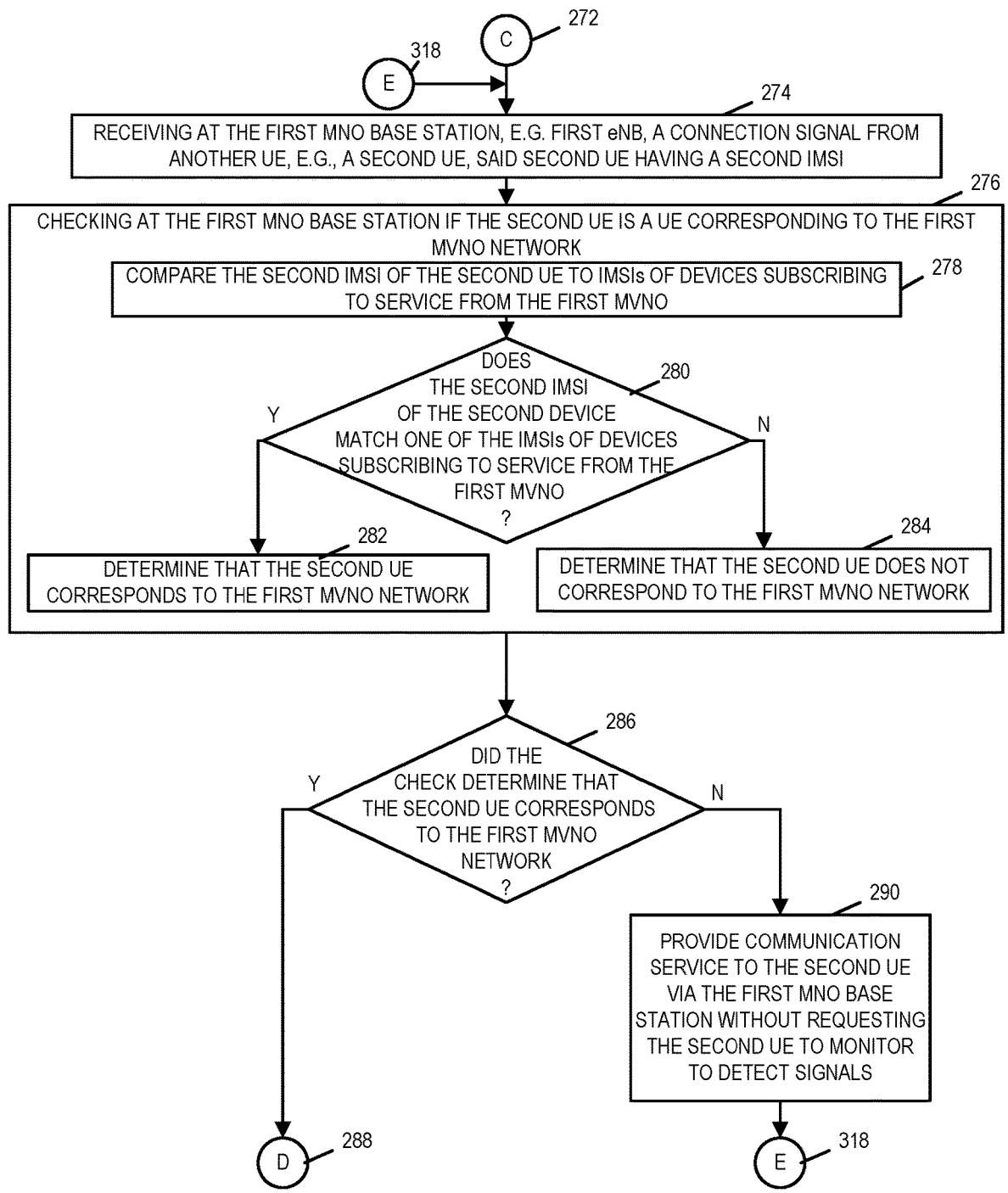
FIG. 2D is a fourth part of a flowchart of an exemplary method of operating a communications system in accordance with an exemplary embodiment.
Figure 2E:
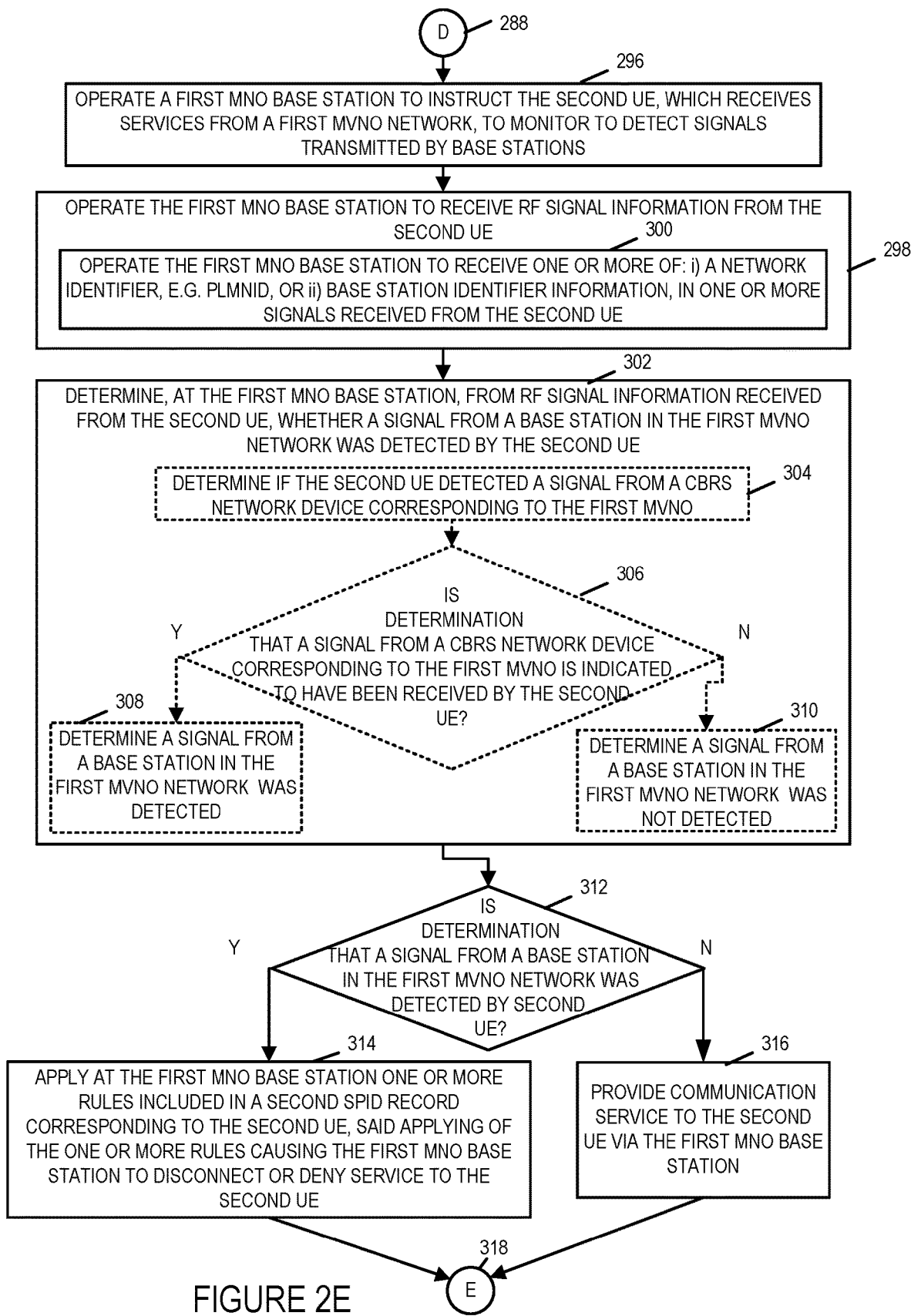
FIG. 2E is a fifth part of a flowchart of an exemplary method of operating a communications system in accordance with an exemplary embodiment.

FIG. 1 is a drawing of an exemplary communications system 100 in accordance with an exemplary embodiment, said exemplary communications system 100 including a Mobile Network Operator (MNO) network 102 and a Mobile Virtual Network Operator (MVNO) network 104, which are partner networks. The MNO network 102 includes a plurality of MNO base stations, e.g. eNBs, (MNO base station 1 106, . . . , MNO base station N 108) with corresponding wireless coverage areas (107, . . . , 109), respectively, a Home Subscribe Server (HSS) 110, and a relay device 112, e.g., a Mobility Management Entity (MME), coupled together via a backhaul network 114. The MVNO network 104 includes a plurality of MVNO network base stations, e.g. CBSD base stations, (MVNO base station 1 116, MVNO base station 2 118, . . . , MVNO base station M 120) with corresponding wireless coverage areas (117, 119, . . . , 191), respectively, and a mobility management entity (MME) 122, coupled together via a backhaul network 125. Communications system 100 further includes a Spectrum Allocation System (SAS) 124, which may be part of the MVNO system 104 or may be external to the MVNO system 104 and coupled to MVNO system 104. Communications system 100 further includes a plurality of user equipment (UE) devices (UE 1 126, UE 2 128, UE 3 130, UE 4 132, UE 5 134, UE 6 136, UE 7 138, . . . , UE N 140. The wireless coverage area of MVNO network 104 is at least partially overlapping with the wireless coverage area of MNO network 102. At least some of the UEs are registered to receive services from the MVNO 104. In the example of FIG. 1, UE 1 126, UE 2 128, UE 3 130, UE 4 132 and UE N 140 are subscribers which are registered to receive services from the MVNO network 104 as indicated by box 141 including "S" to indicate subscriber to MVNO network 104 services, while UE 5 134, UE 6 136 and UE 7 138 are not subscribers to the MVNO network 104. At least some of the UEs (126, 128, 130, 132, 134, 136, 138, . . . , 140) are mobile devices which may move throughout the system.

As shown in FIG. 1, UE 1 is currently located in both the coverage area 107 of MNO base station 1 106 and the coverage area 117 of MVNO base station 1 116; UE 2 128 is currently located in the coverage area 107 of MNO base station 1 106 but is outside the coverage area of any MVNO base stations; UE 5 134 is currently located in both the coverage area 107 of MNO base station 1 106 and the coverage area 117 of MVNO base station 1 116; UE 6 136 is currently located in the coverage area 107 of MNO base station 1 106 but is outside the coverage area of any MVNO base stations.

As shown in FIG. 1, UE 3 is currently located in both the coverage area 107 of MNO base station 1 106 and the coverage area 119 of MVNO base station 2 118; UE 4 132 is currently located in the coverage area 121 of MVNO base station M 120 but is outside the coverage area of any MNO base stations; UE 7 138 is located within the coverage area 109 of MNO base station N 108 but is outside the coverage areas of any of the MVNO base stations; and UE N 140 is located within the coverage area 109 of MNO base station N 108 but is outside the coverage areas of any of the MVNO base stations.

FIG. 2, comprising the combination of FIG. 2A, FIG. 2B, FIG. 2C, FIG. 2D and FIG. 2E, is a flowchart 200 of an exemplary method of operating a communications system in accordance with an exemplary embodiment. Operation starts in step 202 in which the communications system is powered on and initialized. Operation proceeds from start step 202 to step 204.

In step 204 mobile virtual network operator (MVNO) base station, e.g., citizens broadband radio service devices (CBSDs), in a first MVNO network are operated to register with a spectrum access system (SAS). Step 204 includes step 206, and in some embodiments, step 208. In step 206 a first MVNO base station, e.g. a first CBSD, in the first MVNO is operated to register with the SAS. In step 208 an Nth MVNO base station, e.g., an Nth CBSD, in the first MVNO is operated to register with the SAS. Operation proceeds from step 204 to step 210.

In step 210 a home subscriber server (HSS) device in the first MVNO network is operated to provide international mobile subscriber identity (IMSI) information indicating IMSIs of subscriber devices, which subscribe to first MVNO service, to a second HSS device in a mobile network operator (MNO) network, said first MVNO network being a partner to the MNO network. Operation proceeds to from step 210 to step 212 or step 212, e.g., depending on the particular embodiment.

In step 212 the second HSS device is operated to generate service provider identifier (SPID) records for subscriber devices which subscribe to first MVNO service, each SPID record corresponding to an IMSI of a device identified to the second HSS device by the first HSS device. Operation proceeds from step 212 to step 214. In step 214 the second HSS device is operated to send the generated SPID records to a relay device, e.g., a mobility management entity (MME) in the MNO network for distribution to base stations, e.g., eNBs, in the MNO network.

Returning to step 216, in step 216, the first HSS device is operated to generate service profile identifier (SPID) records for subscribers' devices which subscribe to first MVNO service, each SPID record corresponding to an IMSI of a device identified to the second HSS device by the first HSS device. Operation proceeds from step 216 to step 218. In step 218 the first HSS device is operated to send the generated SPID records to a relay device, e.g., a mobility management entity (MME) in the MNO network for distribution to base stations, e.g., eNBs, in the MNO network.

Operation proceeds from step 214 or step 218 to step 220. In step 220 the relay device, e.g. MME in the MNO network, is operated to receive the SPID records. Operation proceeds from step 220 to step 222. In step 222 the relay device is operated to distribute, e.g. sends, the SPID records to base stations, e.g. eNBs, in the MNO network. Operation proceeds from step 222 to step 224.

In step 224 a first MNO base station, e.g. a first eNB, is operated to receive the SPID records. Operation proceeds from step 224 to step 226. In step 226 the first MNO base station, e.g. first eNB, is operated to store in the first MNO base station SPID records for UE devices which receive services from the first MVNO, a first SPID record being one of said SPID records. Operation proceeds from step 226, via connecting node A 228, to step 230.

In step 230 the first MNO base station, e.g., first eNB, receives a connection signal from a first UE, said first UE having a first IMSI. Operation proceeds from step 230 to step 232.

In step 232 the first MNO base station checks, at the first MNO base station, if the first UE is a UE corresponding to the first MVNO network. Step 232 includes steps 234, 236, 238, 240. In step 234 the first MNO base station compares the first IMSI of the first UE to IMSIs of devices subscribing to service from the first MVNO. Operation proceeds from step 234 to step 236. In step 236, if the first IMSI of the first UE device matches one of the IMSIs of devices subscribing to service from the first MVNO, then operation proceeds from step 236 to step 238, in which the first MVNO base station determines that the first UE corresponds to the first MVNO network. However if the first IMSI of the first UE device does match any of the IMSIs of devices subscribing to service from the first MVNO, then operation proceeds from step 236 to step 240, in which the first MVNO base station determines that the first UE does not corresponds to the first MVNO network. Operation proceeds from step 232 to step 242.

In step 242, if the check of step 232, determined that the first UE corresponds to the first MVNO network, then operation proceeds from step 242, via connecting node B 244, to step 250. However, if the check of step 232, determined that the first UE does corresponds to the first MVNO network, then operation proceeds from step 242 to step 246, in which the first MNO base station provides communication service to the first UE via the first MNO base station without requesting the first UE to monitor to detect signals, e.g. from base stations in the first MVNO network. Operation proceeds from step 246, via connecting node C 272, to step 274.

Returning to step 250, in step 250 the first MNO base stations instructs a first UE, which receives services from the first MVNO network, to monitor to detect signals transmitted by base stations, e.g., MNO base stations, e.g., eNBs in the MNO network, and MVNO base stations, e.g. CBSDs in the MVNO network. Operation proceeds from step 250 to step 252. In step 252 the first MNO base station receives RF signal information from the first UE. Step 252 includes step 254 in which the first base station receives one or more of: i) a network identifier, e.g., a Public Land Mobile Network Identifier (PLMNID), or base station identifier information, in one or more signals received from the first UE. Operation proceeds from step 252 to step 256.

In step 256 the first base station determines, from RF signal information received from the first UE, whether a signal from a base station in the first MVNO network was detected by the first UE. In some embodiments, the first MVNO network is a CBRS network, and step 256 includes steps 258, 260, 262 and 264. In step 258 the first MNO base station determines if the first UE detected a signal from a CBRS network device corresponding to the first MVNO network. Operation proceeds from step 258 to step 260. In step 260 if the determination of step 258 is that a signal from a CBRS network device corresponding to the first MVNO network is indicated to have been received by the first UE, then operation proceeds from step 260 to step 262, in which the first MNO base station determines that a signal from a base station in the first MVNO network was detected. In step 260 if the determination of step 258 is that a signal from a CBRS network device corresponding to the first MVNO network is not indicated to have been received by the first UE, then operation proceeds from step 260 to step 264, in which the first MNO base station determines that a signal from a base station in the first MVNO network was not detected.

Operation proceeds from step 256 to step 266. In step 266 if the determination is that a signal from a base station in the first MVNO network was detected by the first UE, then operation proceeds from step 266 to step 268, in which the first MNO base station applies one or more rules included in a first SPID record corresponding to the first UE, said applying of the one or more rules causing the first MNO base station to disconnect or deny service to the first UE. In step 266 if the determination is that a signal from a base station in the first MVNO network was not detected by the first UE, then operation proceeds from step 266 to step 270, in which the first MNO base station provides communication service the first UE via the first MNO base station. Operation proceeds from step 268 or step 270 via connecting node C 272 to step 274.

In step 274 the first MNO base station, e.g., the first eNB, receives a connection signal from another UE, e.g., a second UE, said second UE having a second IMSI. Operation proceeds from step 274 to step 276.

In step 276 the first MNO base station checks, at the first MNO base station, if the second UE is a UE corresponding to the first MVNO network. Step 276 includes steps 278, 280, 282, 284. In step 278 the first MNO base station compares the second IMSI of the second UE to IMSIs of devices subscribing to service from the first MVNO. Operation proceeds from step 278 to step 280. In step 280, if the second IMSI of the second UE device matches one of the IMSIs of devices subscribing to service from the first MVNO, then operation proceeds from step 280 to step 282, in which the first MVNO base station determines that the second UE corresponds to the first MVNO network. However, if the second IMSI of the second UE device does match any of the IMSIs of devices subscribing to service from the first MVNO, then operation proceeds from step 280 to step 284, in which the first MVNO base station determines that the second UE does not corresponds to the first MVNO network. Operation proceeds from step 276 to step 286.

In step 286, if the check of step 276, determined that the second UE corresponds to the first MVNO network, then operation proceeds from step 286, via connecting node D 288, to step 296. However, if the check of step 276, determined that the second UE does corresponds to the first MVNO network, then operation proceeds from step 286 to step 290, in which the first MNO base station provides communication service to the second UE via the first MNO base station without requesting the first UE to monitor to detect signals, e.g. from base stations in the first MVNO network. Operation proceeds from step 292, via connecting node E 318, to the input of step 274.

Returning to step 296, in step 296 the first MNO base stations instructs the second UE, which receives services from the first MVNO network, to monitor to detect signals transmitted by base stations, e.g., MNO base stations, e.g., eNB s in the MNO network, and MVNO base stations, e.g. CBSDs in the MVNO network. Operation proceeds from step 296 to step 298. In step 298 the first MNO base station receives RF signal information from the second UE. Step 298 includes step 300 in which the first base station receives one or more of: i) a network identifier, e.g., a Public Land Mobile Network Identifier (PLMNID), or base station identifier information, in one or more signals received from the second UE. Operation proceeds from step 298 to step 302.

In step 302 the first base station determines, from RF signal information received from the second UE, whether a signal from a base station in the first MVNO network was detected by the second UE. In some embodiments, the first MVNO network is a CBRS network, and step 302 includes steps 304, 306, 308 and 310. In step 304 the first MNO base station determines if the first UE detected a signal from a CBRS network device corresponding to the first MVNO network. Operation proceeds from step 304 to step 306. In step 306 if the determination of step 304 is that a signal from a CBRS network device corresponding to the first MVNO network is indicated to have been received by the second UE, then operation proceeds from step 306 to step 308, in which the first MNO base station determines that a signal from a base station in the first MVNO network was detected. In step 306 if the determination of step 304 is that a signal from a CBRS network device corresponding to the first MVNO network is not indicated to have been received by the second UE, then operation proceeds from step 306 to step 310, in which the first MNO base station determines that a signal from a base station in the first MVNO network was not detected.

Operation proceeds from step 302 to step 312. In step 312 if the determination is that a signal from a base station in the first MVNO network was detected by the second UE, then operation proceeds from step 312 to step 314, in which the first MNO base station applies one or more rules included in a second SPID record corresponding to the second UE, said applying of the one or more rules causing the first MNO base station to disconnect or deny service to the second UE. In step 312 if the determination is that a signal from a base station in the first MVNO network was not detected by the second UE, then operation proceeds from step 312 to step 316, in which the first MNO base station provides communication service the second UE via the first MNO base station. Operation proceeds from step 314 or step 316 via connecting node E 318 to the input of step 274.

Figure 3:
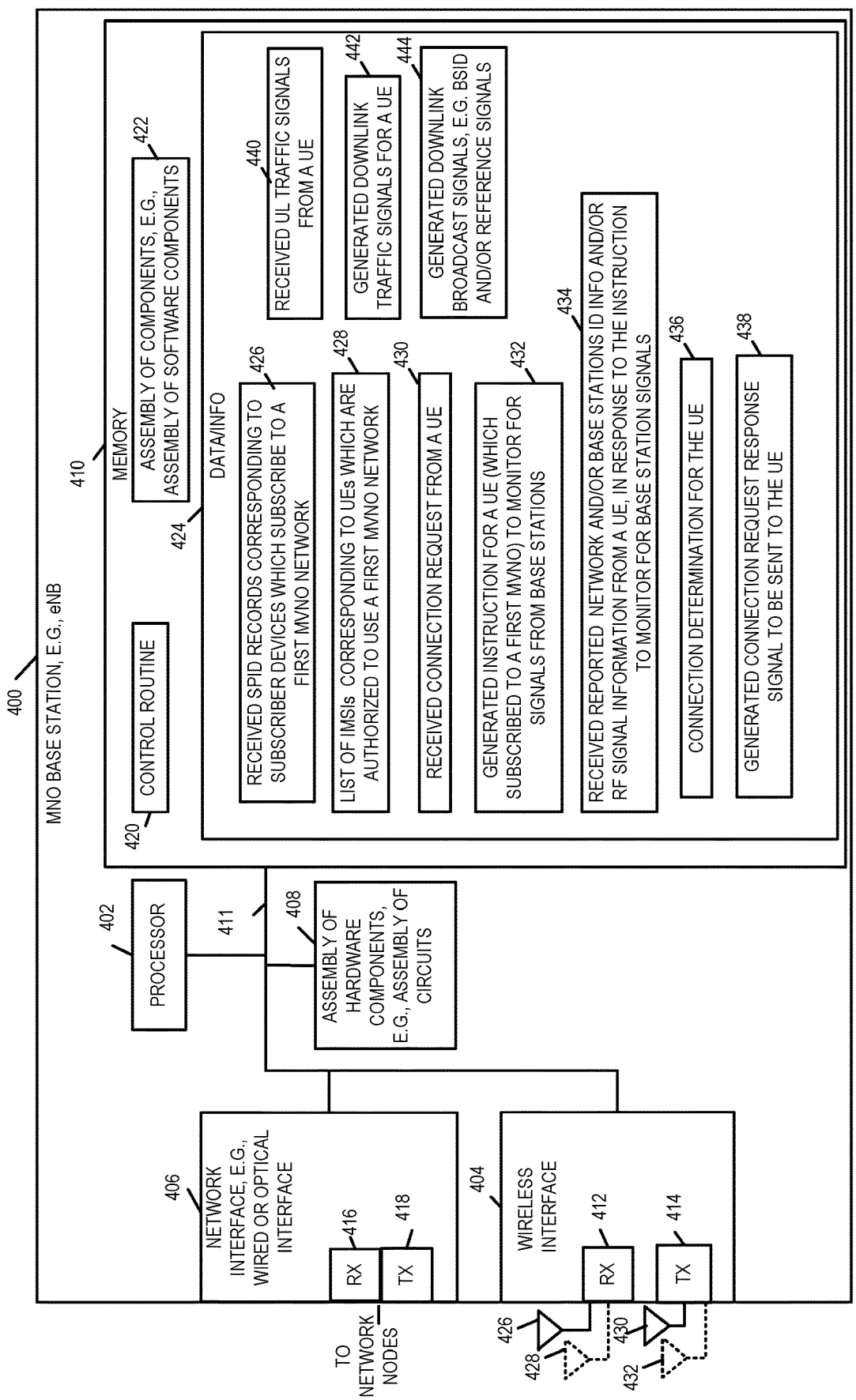
FIG. 3 is a drawing of an exemplary MNO base station, e.g., a eNB, in accordance with an exemplary embodiment.

FIG. 3 is a drawing of an exemplary MNO base station 400, e.g., an eNB, in accordance with an exemplary embodiment. In various embodiments, MNO base station is a cellular base station using licensed spectrum. MNO base station 400 of FIG. 3 is, e.g., any of the MNO base stations (MNO base station 1 106, ..., MNO base station N 108) of MNO network 102 of system 100 of FIG. 1.

Exemplary MNO base station 400 includes a processor 402, e.g., a CPU, a wireless interface 404, a network interface 406, an assembly of hardware components 408, e.g., assembly of circuits, and memory 410, coupled together via a bus 411 over which the various elements may interchange data and information.

Wireless interface 404 includes a wireless receiver 412 coupled to one or more receive antennas or antenna elements (426, 428) via which the MNO base station 400 may receive uplink signals from UE devices. Exemplary received uplink signals from UE devices include, e.g., connection request signals, signal reporting information corresponding to detected base stations, RF measurement reporting signals, and traffic data signals. Wireless interface 404 further includes a wireless transmitter 418 coupled to one or more transmit antennas or antenna elements (430, 432) via which the MNO base station 400 may transmit downlink signals to UEs. Exemplary transmitted downlink signals include, e.g., base station broadcast signals conveying base station identification information, downlink reference signals used for power and/or noise measurements, connection request response signals, a signal instructing a UE which receives services from a MVNO network to monitor to detect signals transmitted by base station, and downlink traffic signals directed to a UE.

Network interface 406, e.g., a wired or optical interface, includes a receiver 416 and a transmitter 418, e.g., via which the MNO base station is coupled to other network nodes, a backhaul network and/or the Internet. Exemplary signals received via receiver 416 include, e.g., SPID records corresponding to UEs which subscribe to services from a MVNO network, said SPID records being sent from a relay device, e.g., a MME in the MNO network.

Memory 410 includes a control routine 420 for controlling basic operations and functions of the MNO base station 400, an assembly of components 422, e.g., an assembly of software components 422, e.g., routines and/or modules for implementing steps of an exemplary method, and data/ information 424. In some embodiments, MNO base station 400 implements steps of the method of flowchart 200 of FIG. 2.

Data information 424 includes received SPID records 426 corresponding to UEs subscribing to a first MVNO network, a list 428 of IMSIs corresponding to UEs subscribing to a first MVNO network, a received connection request 430 from a UE, a generated instruction 432 for a UE (identified as corresponding to a MVNO) to monitor for signals from base stations and report results, received reported network and/or base station ID and/or RF signal information 434 from a UE in response to a sent instruction to monitor, a connection determination 436 for the UE, a generated connection request response signal 438, e.g. indicating connection allowed or connection denied, received UL traffic signals from a UE 440, generated downlink traffic signals from a UE 442, and generated downlink traffic signals 440 intended for a UE, and generated downlink broadcast signals 444, e.g., base station ID (BSID) signals and/or reference signals used for measurements.

Figure 4:
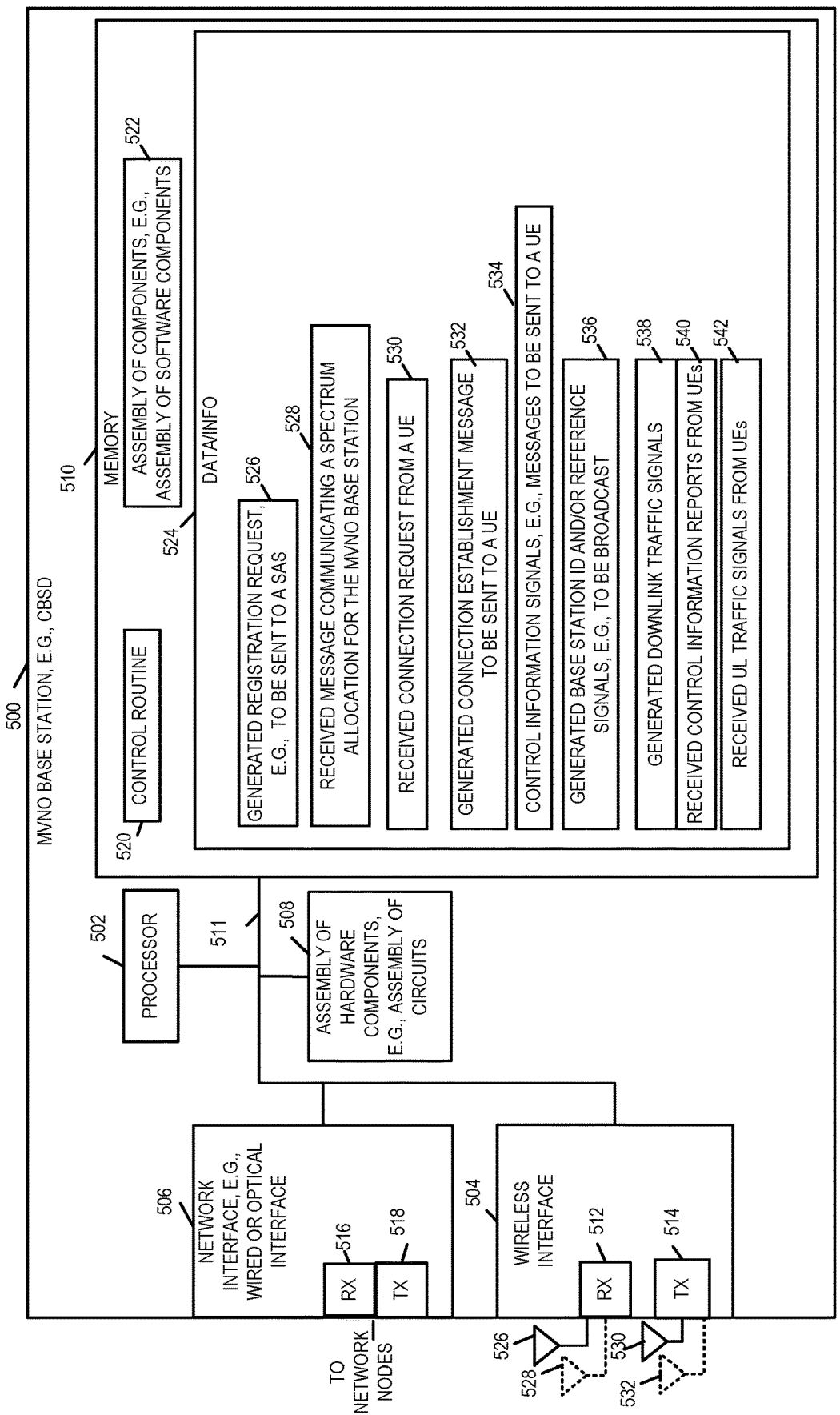
FIG. 4 is a drawing of an exemplary MVNO base station, e.g., a CBSD, in accordance with an exemplary embodiment.

FIG. 4 is a drawing of an exemplary MVNO base station 500, e.g., a Citizens Broadband radio Service Device (CBSD), in accordance with an exemplary embodiment. In various embodiments, MVNO base station 500 is a CBRS base station, e.g., a CBSD, using shared spectrum. In some embodiments, MVNO base station 500 is a small cell base station using unlicensed spectrum. MVNO base station 500 of FIG. 4 is, e.g., any of the MVNO base stations (MVNO base station 1 116, MVNO base station 2 118, ..., MVNO base station M 120) of MVNO network 104 of system 100 of FIG. 1.

Exemplary MVNO base station 500 includes a processor 502, e.g., a CPU, a wireless interface 504, a network interface 506, an assembly of hardware components 508, e.g., assembly of circuits, and memory 510, coupled together via a bus 511 over which the various elements may interchange data and information.

Wireless interface 504 includes a wireless receiver 512 coupled to one or more receive antennas or antenna elements (526, 528) via which the MVNO base station 500 may receive uplink signals from UE devices. Exemplary received uplink signals from UE devices include, e.g., connection establishment signals, control information reports, and uplink traffic data signals. Wireless interface 504 further includes a wireless transmitter 518 coupled to one or more transmit antennas or antenna elements (530, 532) via which the MVNO base station 500 may transmit downlink signals to UEs. Exemplary transmitted downlink signals include, e.g., base station broadcast signals conveying base station identification information, downlink reference signals used for power and/or noise measurements, connection establishment signals, and downlink traffic signals directed to a UE.

Network interface 506, e.g., a wired or optical interface, includes a receiver 516 and a transmitter 518, e.g., via which the MVNO base station is coupled to other network nodes, a backhaul network and/or the Internet. Exemplary signals received via receiver 516 include, e.g., a signal communicating a spectrum allocation from an SAS to the MVNO base station, e.g., received in response to registration. Exemplary signals transmitted by transmitter 518 include, e.g., a registration request signal sent to a SAS.

In some embodiments the MVNO base station 500 includes an additional wireless interface with a receiver, transmitter, additional antennas, e.g., for coupling the MVNO base station 500 to a fixed location wireless device which provides a backhaul connection and/or the Internet connection, e.g., in place of or in addition to wired/optical network interface 506.

Memory 510 includes a control routine 520 for controlling basic operations and functions of the MVNO base station 500, an assembly of components 522, e.g., an assembly of software components, e.g., routines and/or modules for implementing steps of an exemplary method, and data/ information 524. In some embodiments, MVNO base station 500 implements steps of the method of flowchart 200 of FIG. 2.

Data/information 524 includes a generated registration request 526, e.g., to be sent to a SAS, a message 528 communicating a spectrum allocation for the MVNO base station, a received connection request 530 from a UE, a generated connection establishment message 532 to be sent to a UE, control information signals 534 to be sent to UEs, generated ID and/or reference signals 536, e.g., to be broadcast, generated downlink traffic signals 538, received control information reports 540 from UEs, and received uplink traffic signals 542 from UEs.

Figure 5:
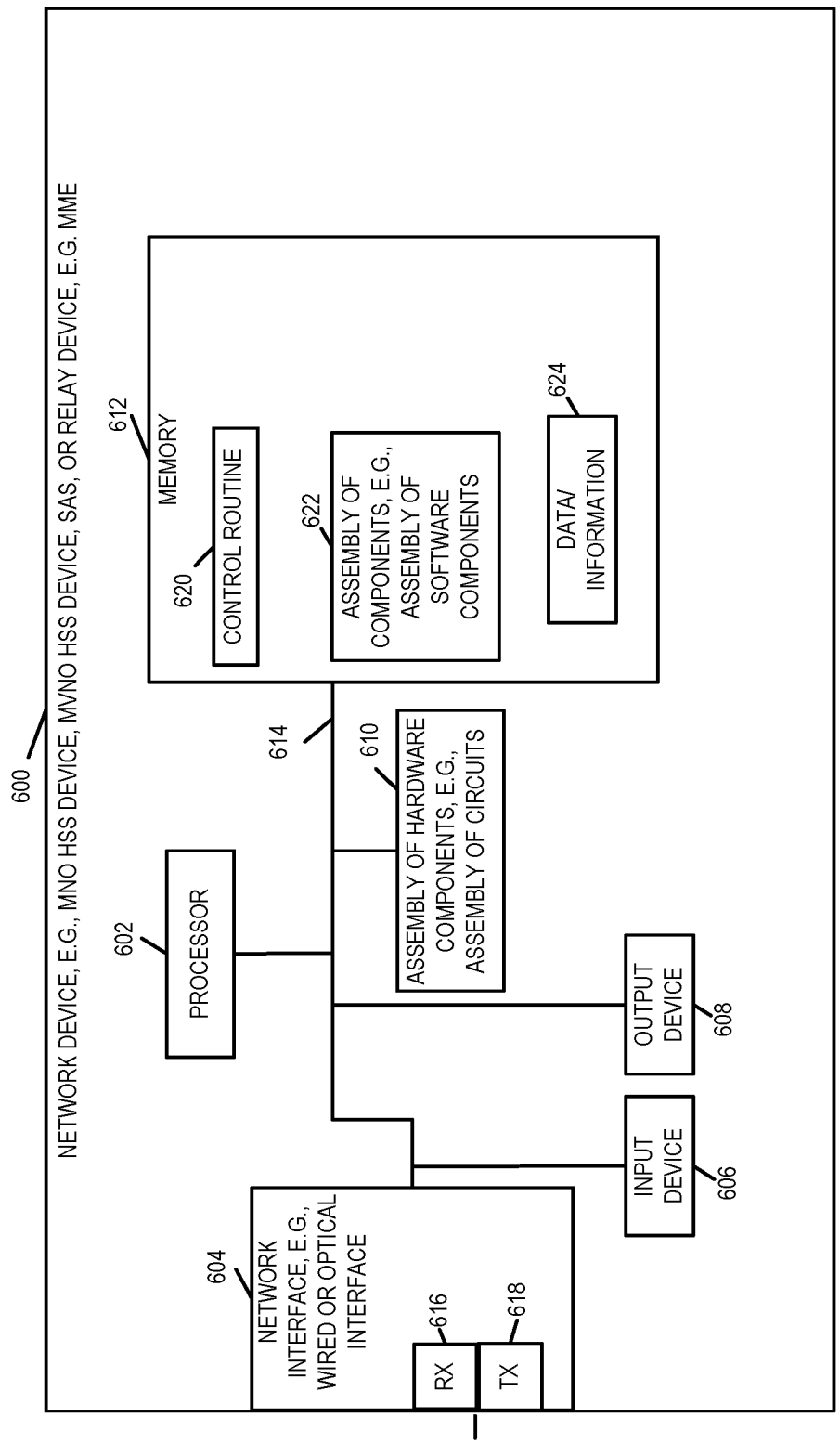
FIG. 5 is a drawing of an exemplary network device, e.g., a MNO Home Subscriber Server (HSS) device, a MVNO HSS device, a relay device, e.g. a mobility management entity (MME), or a spectrum allocation system (SAS) in accordance with an exemplary embodiment.

FIG. 5 is a drawing of an exemplary network device 600, e.g., a MNO Home Subscriber Server (HSS) device, a MVNO HSS device, a relay device, e.g. a mobility management entity (MME), or a spectrum allocation system (SAS) in accordance with an exemplary embodiment. Network device 600 is, e.g., any of HSS 110, HSS 122, SAS 124, or relay device 112, e.g., a MME, of system 100 of FIG. 1.

Network device 600 includes a processor 602, e.g., a CPU, a network interface 604, e.g., a wired or optical interface, a input device 606, e.g. keyboard, and output device 608, e.g. display, an assembly of hardware components 610, e.g. assembly of circuits, and memory 620 coupled together via a bus 614 over which the various elements may interchange data and information. Network interface 604 includes a receiver 616, via which the network device 600 receives signals and a transmitter 618 via which the network device 600 transmits signals.

Memory 612 includes a control routine 620, an assembly of components 622, e.g., assembly of software components, and data/information 624.

In an embodiment in which network node is a MNO HSS device, exemplary signals received by receiver 616 include signals communicating IMSI information of subscriber devices, which subscribe to a MVNO service, and exemplary signals sent by transmitter 618 include generated SPID records for subscriber devices which subscribe to a MVNO service, each SPID record corresponding to an IMSI of device identified to the MNO HSS device by the MVNO HSS device, said generated SPID records to be sent to a relay device, e.g., a MME, for distribution to MNO base stations.

In an embodiment in which network node 600 is a MVNO HSS device, exemplary signals received by receiver 616 include information identifying user devices which subscribe to the MVNO network, e.g. new subscriber information including an IMSI and exemplary signals sent by transmitter 618 include signals communicating IMSI information of subscriber devices, which subscribe to MVNO service, said information being sent to a MNO network HSS, to be used to generate SPID records.

In an embodiment in which network node 600 is a SAS, exemplary signals received by receiver 616 include signals communicating a registration request from a MVNO base station and exemplary signals sent by transmitter 618 include a message communicating a spectrum allocation to a MVNO base station.

In an embodiment in which network node 600 is a relay device, e.g., a MME, exemplary signals received by receiver 616 include signals communicating SPID records for subscriber devices which subscribe to a first MVNO network, e.g. sent from a MNO or MVNO HSS to the relay device, and exemplary signals sent by transmitter 618 include SPID record signals (corresponding to user devices subscribing to a MVNO network) to be sent, e.g., distributed, to MNO base stations.

Figure 6:
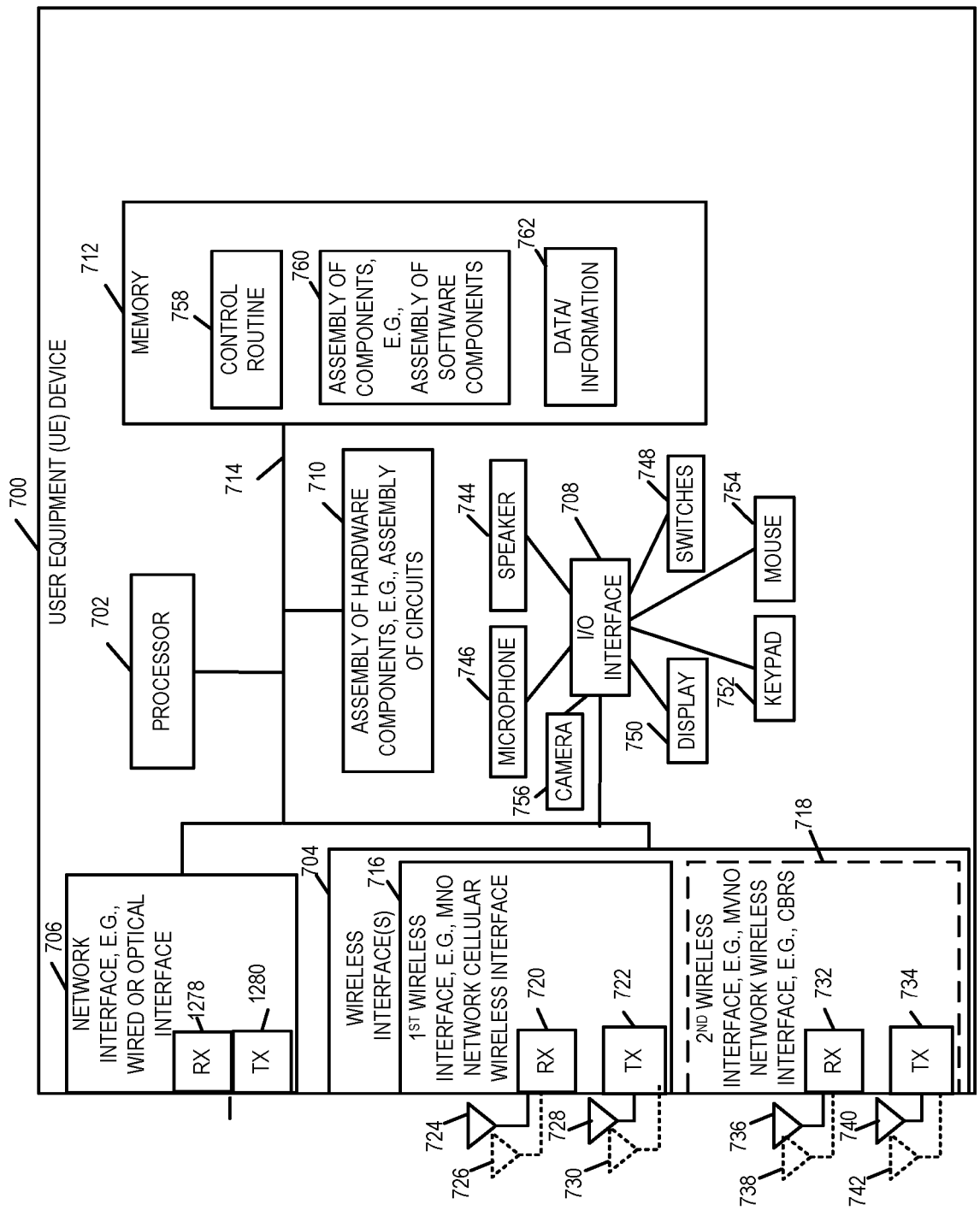
FIG. 6 is a drawing of an exemplary user equipment (UE) device in accordance with an exemplary embodiment.

FIG. 6 is a drawing of an exemplary user equipment (UE) 700 device in accordance with an exemplary embodiment. Exemplary UE 700 is, e.g. any of the UEs (UE 1 126, UE 2 128, UE 3 130, UE 4 132, UE 5 134, UE 6 136, UE 7 138, . . . , UE N 140) of system 100 of FIG. 1. Exemplary UE 700 includes a processor 702, e.g., a CPU, wireless interface(s) 704, a network interface 706, an I/O interface 708, an assembly of hardware components 710, e.g., assembly of circuits, and memory 712, coupled together via a bus 714 over which the various elements may interchange data and information.

Wireless interface(s) 704 includes one or more wireless interfaces including a first wireless interface 716, e.g., a MNO network cellular wireless interface, and optionally, a second wireless interface 718, e.g. a MVNO network wireless interface, e.g., a CBRS wireless interface for communicating with a CBSD base station. In some embodiments, the first wireless interface 716 supports communications with both an MNO network, e.g., a cellular network using licensed spectrum, and a MVNO network, e.g. a CBRS network, e.g., with the first wireless interface 716 being time shared between both networks and/or the first wireless interface supporting concurrent communications on two different frequency bands, the first frequency band corresponding to the MNO network and the second frequency band corresponding to the MVNO network.

First wireless interface 716, e.g. a MNO network cellular wireless interface, includes a wireless receiver 720 coupled to one or more antennas or antenna elements (724, . . . , 726) via which the UE 700 can receive wireless signals, e.g. from a MNO base station. First wireless interface 716, e.g. a MNO network cellular wireless interface, further includes a wireless transmitter 722 coupled to one or more antennas or antenna elements (728, . . . , 720) via which the UE 700 can transmit wireless signals, e.g. to a MNO network base station.

Second wireless interface 718, e.g. a MVNO network wireless interface, e.g., a CBRS interface, includes a wireless receiver 732 coupled to one or more antennas or antenna elements (736, . . . , 738) via which the UE 700 can receive wireless signals, e.g. from a MVNO base station, e.g., a CBSD. Second wireless interface 718 further includes a wireless transmitter 734 coupled to one or more antennas or antenna elements (740, . . . , 742) via which the UE 700 can transmit wireless signals, e.g. to a MVNO base station, e.g. a CBSD.

Network interface 706, e.g. a wired or optical interface, includes a receiver 1278 and a transmitter 1280 via which the UE 700 can receive and send signals when the UE is coupled to network devices via a wired or optical link, e.g. at a fixed location.

UE device further includes a plurality of user input output devices (speaker 744 m microphone 746, switches 748, mouse 754, keypad 752, display 750, e.g. a touch screen display, and camera 756, which are coupled to I/O interface 708, which couples the various I/O devices to bus 714 and to other elements within UE 700.

Memory 712 includes a control routine 758, an assembly of components 760, e.g. assembly of software components 760, and data/information 762. Data/information 762 includes a generated connection request to be sent to a MNO base station, a received instruction to monitor for signals from base stations (MVNO and MNO base stations) and to report back, a generated message to be sent to a MNO base station communicating detected base station ID information and/or measured RF information, e.g. RSSI and/or SNR corresponding to detected base stations, a received response to the connection request, e.g. connection to MNO base station accepted or denied.

Figure 7A:
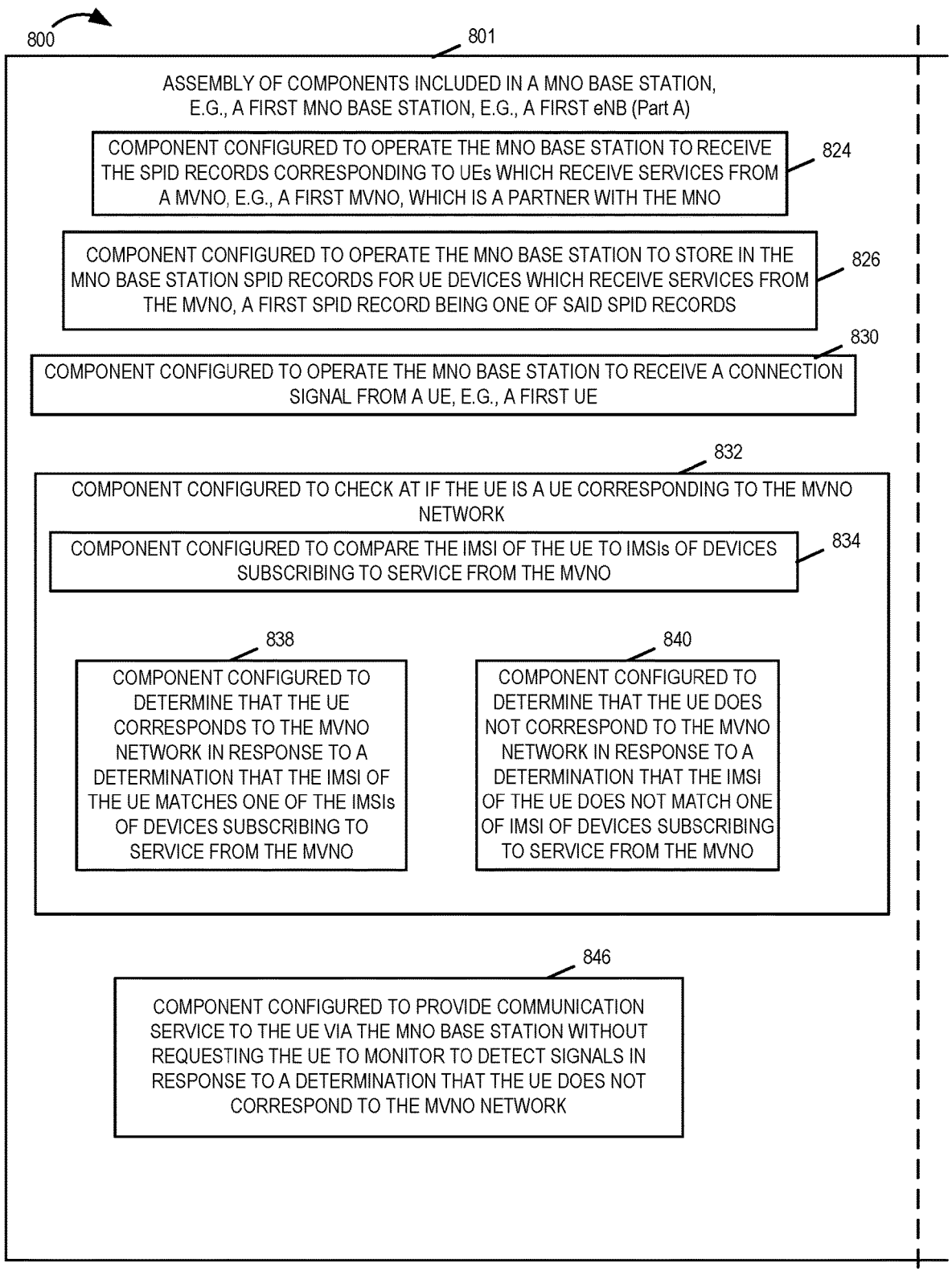
FIG. 7A is a first part of a drawing of an exemplary assembly of components which may be including in an exemplary MNO base station in accordance with an exemplary embodiment.
Figure 7B:
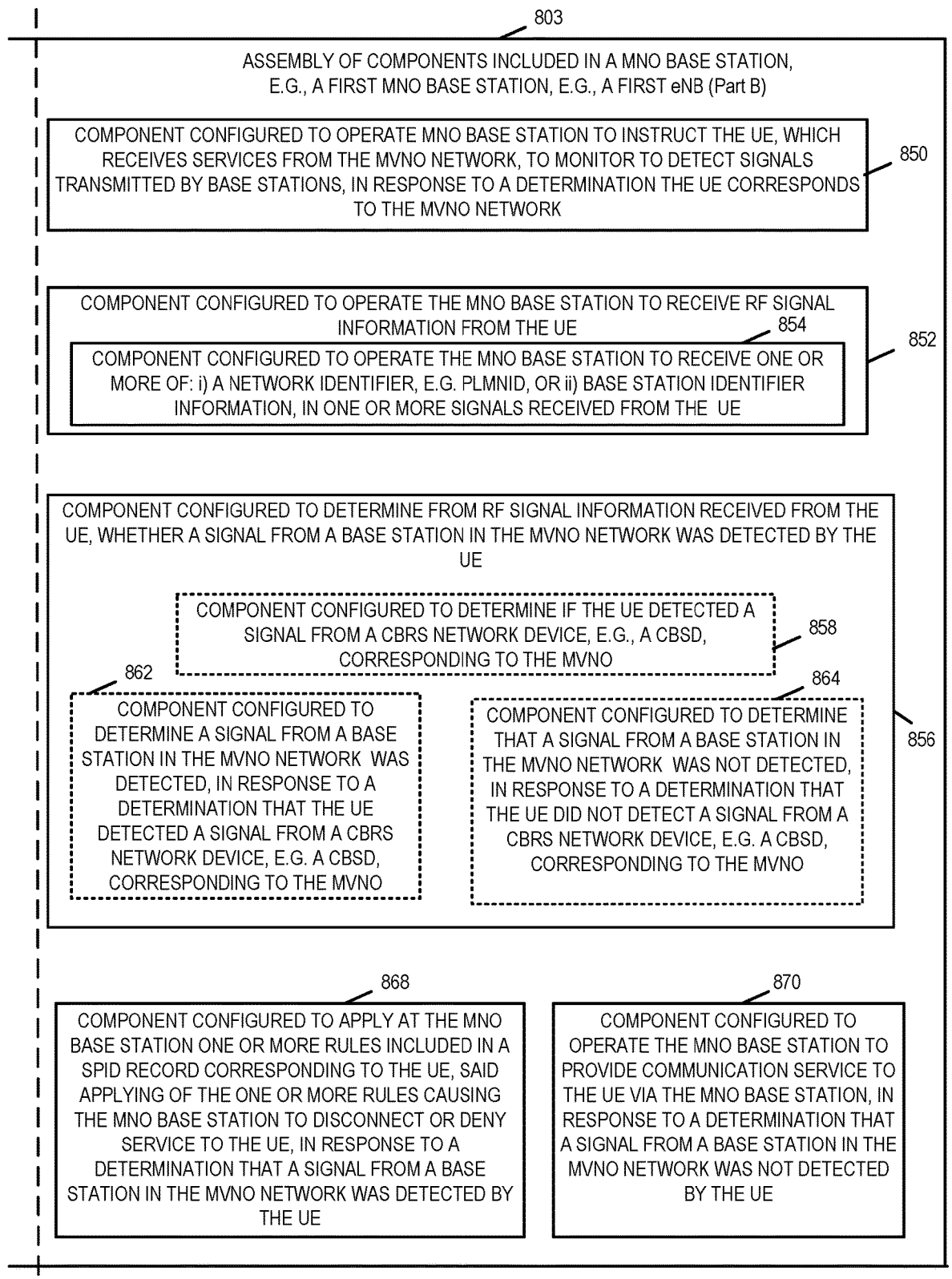
FIG. 7B is a second part of a drawing of an exemplary assembly of components which may be including in an exemplary MNO base station in accordance with an exemplary embodiment.

FIG. 7, comprising the combination of FIG. 7A and FIG. 7B, is a drawing of an assembly of components 800, comprising the combination of Part A 801 and Part B 803, which may be included in an exemplary MNO base station, e.g., an eNB, in accordance with an exemplary embodiment. Assembly of components 800 is, e.g., included in any of the MNO base stations (106, . . . , 108) of Figure, MNO base station 400 of FIG. 3, and/or an MNO base station implementing steps of the method of flowchart 200 of FIG. 2.

The components in the assembly of components 800 can, and in some embodiments are, implemented fully in hardware within a processor, e.g., processor 402, e.g., as individual circuits. The components in the assembly of components 800 can, and in some embodiments are, implemented fully in hardware within the assembly of hardware components 408, e.g., as individual circuits corresponding to the different components. In other embodiments some of the components are implemented, e.g., as circuits, within processor 402 with other components being implemented, e.g., as circuits within assembly of components 408, external to and coupled to the processor 402. As should be appreciated the level of integration of components on the processor and/or with some components being external to the processor may be one of design choice. Alternatively, rather than being implemented as circuits, all or some of the components may be implemented in software and stored in the memory 410 of the MNO base station 400, with the components controlling operation of control server 1400 to implement the functions corresponding to the components when the components are executed by a processor e.g., processor 402. In some such embodiments, the assembly of components 800 is included in the memory 410 as part of assembly of software components 422. In still other embodiments, various components in assembly of components 800 are implemented as a combination of hardware and software, e.g., with another circuit external to the processor providing input to the processor which then under software control operates to perform a portion of a component's function.

When implemented in software the components include code, which when executed by a processor, e.g., processor 402, configure the processor to implement the function corresponding to the component. In embodiments where the assembly of components 800 is stored in the memory 410, the memory 410 is a computer program product comprising a computer readable medium comprising code, e.g., individual code for each component, for causing at least one computer, e.g., processor 402, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the MNO base station 400 or elements therein such as the processor 402, to perform the functions of corresponding steps illustrated and/or described in the method of one or more of the flowcharts, signaling diagrams and/or described with respect to any of the Figures. Thus, the assembly of components 800 includes various components that perform functions of corresponding one or more described and/or illustrated steps of an exemplary method, e.g., steps of the method of flowchart 200 of FIG. 2 and/or steps of the method of flowchart 900 of FIG. 9.

Assembly of components 800 includes a component 824 configured to operate the MNO base station to receive SPID records corresponding to UEs, which receive services from a MVNO, e.g., a first MVNO, which is a partner with the MNO, a component 826 configured to operate the MNO base station to store in the MNO base station SPID records for UE device which receive services from the MVNO, a first SPID record being one of said SPID records, and a component 830 configured to operate the MNO base station to received a connection signal from a UE. The UE is, e.g., one of the UEs (126, 128, 130, 132, 134, 136, 138, . . . 140) of system 100 of FIG. 1, which may be a UE implemented in accordance with UE 700 of FIG. 6.

Assembly of components 800 further includes a component 832 configured to monitor for and receive a connection signal from a UE. Component 832 includes a component 834 configured to compare the IMSI of the UE to the IMSIs of devices subscribing to service from the MVNO and determine if there is a match, a component 836 configured to determine that the UE corresponds to the MVNO network in response to a determination that the IMSI of the UE matches one of the IMSIs of devices subscribing to service from the MVNO, and a component 840 configured to determine that the UE does not correspond to the MVNO network in response to a determination that the IMSI of the UE does not match one of the IMSIs of devices subscribing to service from the MVNO.

Assembly of components 800 further includes a component 846 configured to provide communication service to the UE via the MNO base station with requesting the UE to monitor to detects signals in response to a determination the UE does not correspond to the MVNO network, a component 850 configured to operate the MNO base station to instruct the UE, which receives services from the MVNO network, to monitor to detect signals transmitted by base stations, in response to a determination that the UE corresponds to the MVNO network, and a component 852 configured to operate the MNO base station to receive identity and/or RF signal information from the UE, e.g., obtained from the monitoring and sent by the UE to the MNO base station. Component 852 includes a component 854 configured to operate the MNO base station to receive one or more of: i) a network identifier, e.g., a public land mobile network identifier (PLMN ID), or ii) base station identifier information in one or more signals received from the UE.

Assembly of components 800 further includes a component 856 configured to determine from RF signal information received from the UE whether a signal from a base station in the MVNO network was detected by the UE. In some embodiments, e.g. some embodiments in which the MVNO network is a CBRS network, component 856 includes a component 856 configured to determine if the UE detected a signal from a CBRS network device, e.g. a CBSD, corresponding to the MVNO, a component 862 configured to determine a signal from a base station in the MVNO network was detected, in response to a determination that the UE detected a signal from a CBRS network device, e.g. a CBSD, corresponding to the MVNO, and a component 864 configured to determine that a signal from a base station in the MVNO network was not detected, in response to a determination that the UE did not detect a signal from a CBRS network device, e.g. a CBSD, corresponding to the MVNO, Assembly of components 800 further includes a component 868 configured to apply at the MNO base station one or more rules included in a SPID record corresponding to the UE, said applying of the one or more rules causing the MNO base station to disconnect or deny service to the UE, said applying the one or more rules being in response to a determination that a signal from a base station in the MVNO network was detected by the UE, and a component 870 configured to operate the MNO base station to provide communications service to the UE via the MNO base station, in response to a determination that a signal from a base station in the MVNO network was not detected by the UE.

Various aspects and/or features in accordance with some embodiments of the present invention are further discussed below.

Subscriber profile identification (SPID) is used to apply different settings to each subscriber group to handle transitions. SPID is stored in Home Subscriber Server (HSS), and the HSS sends SPID(s) to MME, and the MME shares SPID(s) with each of the eNBs in a certain region.

When a UE connects to an eNB, the eNB checks to see if for the UE there is any SPID profile stored in the eNB, which can be applied to that UE or UEs. Each SPID profile has UE specific identifies such as IMSI or IMEI. When a UE connects to an eNB, the eNB checks the UE's IMSI or IMEI to check if there is any matching SPID to the UE. The MVNO would like to keep each of the UEs in the MVNO's CBRS network as long as possible so that the MVNO does not pay the MNO for data offload of the MVNOs subscribers. Therefore, in accordance with a feature of some embodiment, the MNO eNBs are configured with SPIDs so the eNBs reject, e.g. conditionally rejects, connection requests from the MVNO's UEs so the MVNOs UEs can stay in the MVNOs network, e.g., as much as possible. For this approach to work there needs to be overlapping coverage of the MNO eNB and the MVNO CBSD. In accordance with a feature of some embodiments, when the MVNO UE is located where there is no MVNO network coverage for the MVNO UE but there is MNO network coverage, the MVNO UE the MNO network, e.g. a MNO eNB will be used, for communications. However, if the MVNO UE is located where there is both MVNO coverage and MNO coverage, the MVNO network, e.g. a MVNO CBSD, will be used for communications. Various features of the present invention facilitate that a MVNO UE will use the MVNO network as much as possible.

Figure 8:
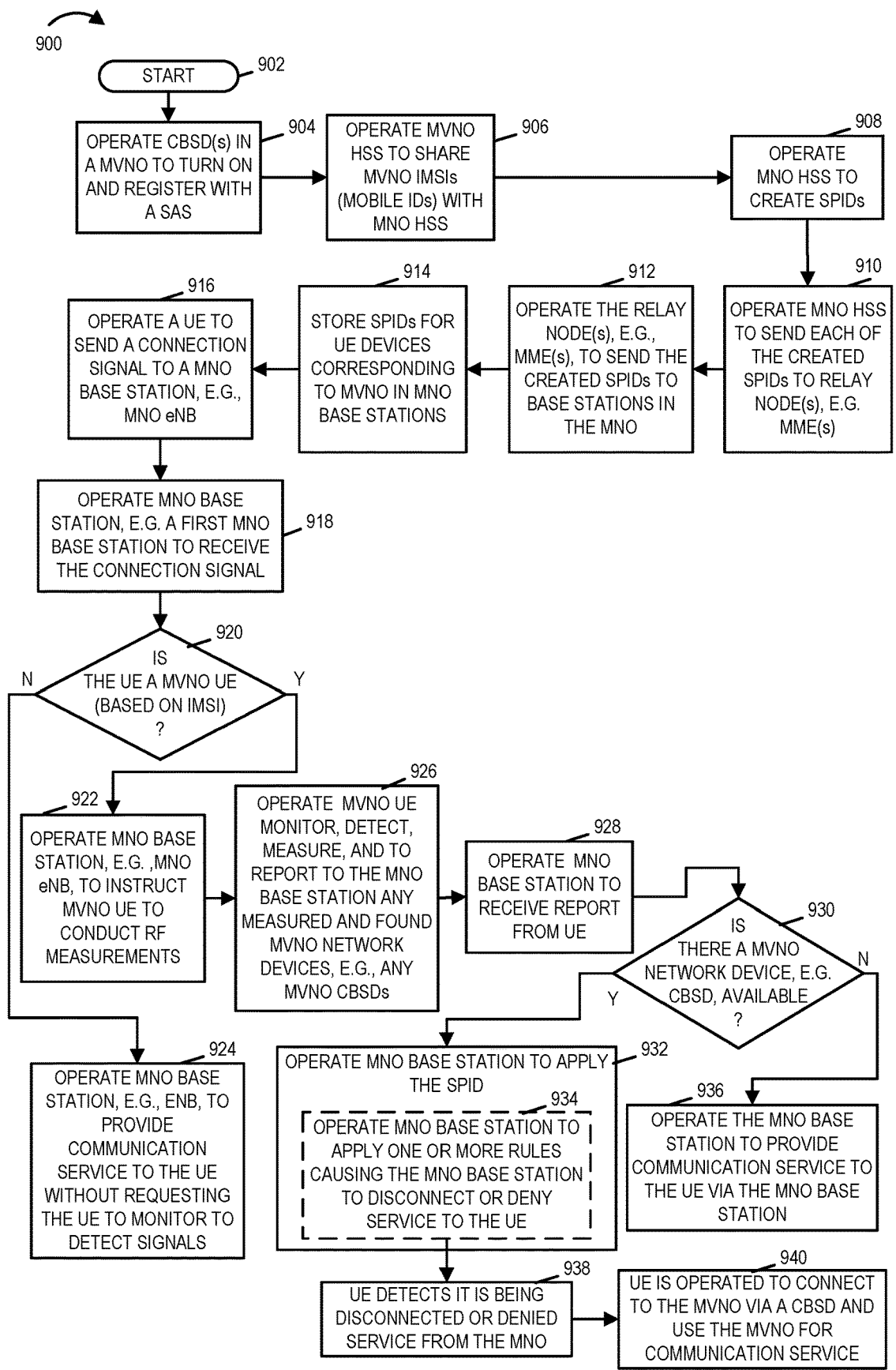
FIG. 8 is a drawing of a flowchart of an exemplary method in accordance with an exemplary embodiment.

FIG. 8 is a flowchart of an exemplary method in accordance with various exemplary embodiments. Operation starts in step 902, in which a communications system, e.g., system 100 of FIG. 1, including a mobile network operator (MNO) network and a mobile virtual operator (MVNO) network, wherein the MVNO and MNO are partners, is powered on and initialized. Operation proceeds from start step 902 to step 904. In step 904 CBSD(s) in the MVNO network turn-on and register with a SAS, and the SAS assigns (allocates) spectrum to the CBSD(s). Operation proceeds from step 904 to step 906.

In step 906 a MVNO HSS is operated to share MVNO IMSIs (mobile IDs corresponding to mobile UEs receiving service from the MVNO) with a MNO HSS. In step 906 the MVNO HSS sends a list of IMSIs, identifying UEs receiving service from the MVNO, to the MNO HSS, which receives and stores the list. Thus in step 906 the MVNO shares IMSI values of its subscribers with the MNO. Operation proceeds from step 906 to step 908.

In step 908 the MNO HSS creates SPIDs corresponding to the received IMSIs, e.g. an SPID for each IMSI. In some embodiments, in step 908 the MNO HSS creates corresponding SPID records. Operation proceeds from step 908 to step 910.

In step 910 the MNO HSS sends each of the created SPIDs to relay node(s), e.g. MME(s). Operation proceeds from step 910 to step 912. In step 912, the relay node(s), e.g., MME(s) send the created SPIDs to base stations in the MNO, e.g., eNBs in the MNO, the base stations in the MNO network, and the base stations in the MNO receive the SPIDs. In some embodiments, in step 912 the SPIDs are sent to each of the MNO network eNBs in the US. Operation proceeds from step 912 to step 914. In step 914 the base stations in the MNO, which received the SPIDs for UE devices corresponding to the MVNO, store the received SPIDs, for future use. Operation proceeds from step 914 to step 916.

In step 916 a UE, e.g. a first UE, sends a connection signal to a MNO base station, e.g. a first MNO base station. Operation proceeds from step 916 to step 918. In step 918 the MNO base station, e.g., first MNO base station, receives the connection signal, said connection signal including an IMSI corresponding to the UE which sent the connection signal. Operation proceeds from step 918 to step 920. In step 920 the base station in the MNO (first MNO base station) determines if the UE is a MVNO UE, e.g., the base station compares the received IMSI from the received connection signal to a list of IMSIs for MVNO UEs and determines if there is a match. If the MNO base station determines that the UE, which sent the connection signal is not a UE receiving service from the MVNO, then operation proceeds from strep 920 to step 924, in which the MNO base station is operated to provide communications service to the UE without requesting the UE to monitor to detect signals, e.g. to be used to determine is a MVNO CBSD is within range of the UE. Alternatively, if the MNO base station determines that the UE which sent the connection signal is a UE, receiving service from the MVNO, then operation proceeds from step 920 to step 922. In step 922 the MNO base station instructs the MVNO UE to monitor to conduct RF measurements. In some embodiment, the instruction tells the UE to measure for any CBRS networks at the location and report back the findings. The instruction, in some embodiments, commands the UE to monitor (e.g., scan) to detect for signals from base stations including CBSD base stations of a particular MVNO, e.g., a particular MVNO service provider's 3.5 GHz CBRS network, to recover network and/or base station identification information, to perform RF measurements on received signals, and to report results of the monitoring back to the MNO base station. Operation proceeds from step 922 to step 926. In step 926 the MVNO UE is operated to monitor for signals, recover network and/or base station ID information (which may, and sometimes does, include information identifying networks and/or CBSDs in the MVNO of interest) from the detected signals, perform RF measurement on the detected signals, generate a report based on detected signals and signal measurements of the detected signals, and send the generated report to the MNO base station. In some embodiments, when the UE scan finds that the MVNO network of interest, the UE reports: ' there is CBRS network available'. In some embodiments, when the UE scan does not detect the MVNO network of interest, the UE reports: ' there is no CBRS network available'. In some embodiments the report, may and sometimes does, includes: network identification information, e.g. PLMN ID(s), and/or base station identification information, e.g., CBSD IDs. Operation proceeds from step 926 to step 928.

In step 928 the MNO base station receives the report from the UE and recovers the communicated information. Operation proceeds from step 928 to step 930. In step 930 the MNO base station determines, based on the received report, if there is a network device, e.g. a CBSD in the CBRS network of interest, available to the UE to provide connectivity for communications. If the determination is that there is not a MVNO network device, e.g. CBSD, available, then operation proceeds from step 930 to step 936, in which the MNO base station is operated to provide communication service to the UE via the MNO base station. However, if the determination is that there is a MVNO network device, e.g. CBSD, available, then operation proceeds from step 930 to step 932. In step 932 the MNO base station is operated to apply the stored SPID corresponding to the UE. Step 932 may, and sometimes does include step 934 in which the MNO base station is operated to apply one or more rules (included in the SPID or SPID record) causing the MNO base station to disconnect or deny service to the UE. Thus the UE is forced to used the MVNO network, e.g. obtaining access via a CBSD of the MVNO, to provide communications service rather than the using the MNO network to provide communications service. Operation proceeds from step 934 to step 938 in which the UE detects that it is being denied service or disconnected from the MNO. Operation proceeds from step 938 to 940. In step 940 the UE is operated to connect to the MVNO via a MVNO CBSD and to use the MVNO for communication service.

Figure 9:
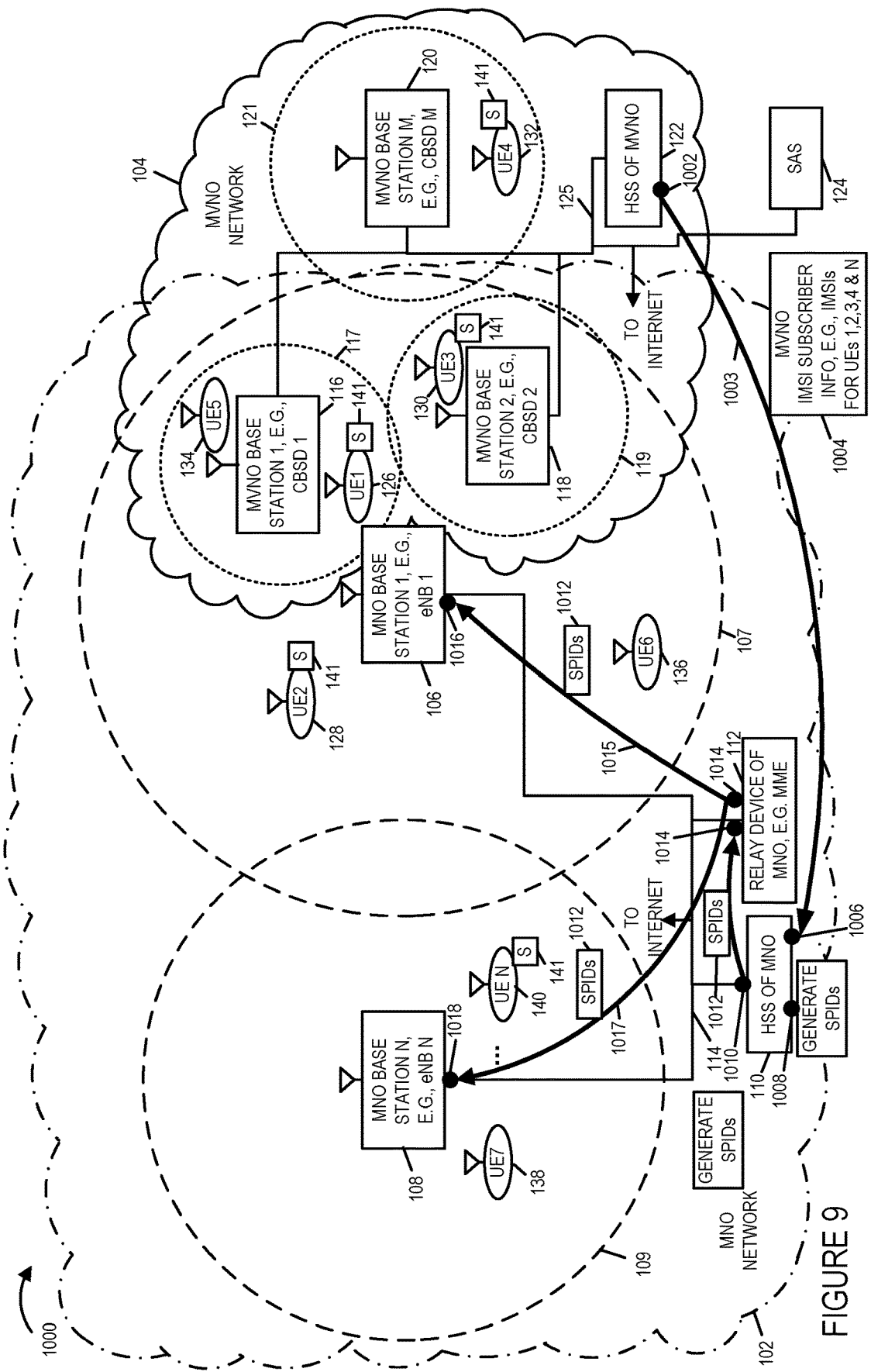
FIG. 9 is a drawing illustrating the communication of MVNO UE IMSIs from the MVNO network to the MNO network, the generation of SPIDs corresponding to the IMSIs, and the distribution of the SPIDs to the MNO base stations in accordance with an exemplary embodiment.

FIG. 9 is a drawing 1000 illustrating the communication of MVNO UE IMSIs from the MVNO network to the MNO network, the generation of SPIDs corresponding to the IMSIs, and the distribution of the SPIDs to the MNO base stations in the exemplary communications system 100 of FIG. 1 in accordance with an exemplary embodiment.

In step 1002 HSS 122 of MVNO 104 generates and sends message(s) 1003 communicating MVNO IMSI subscriber information 1004, e.g., the IMSIs for UE 1 126, UE 2 128, UE 3 130, UE 4 132, and UE N 140, to HSS 120 of MNO 102. In step 1006 HSS 110 receives message(s) 1003 and recovered the communicated MVNO IMSI subscriber information 1004. In step 1008 the MNO HSS 110 generates SPIDs, e.g., one SPID for each of the received IMSIs. In step 1010 HSS 110 generates and sends message(s) 1011 communicating the generated SPIDs 1012 to relay device 112, e.g., a MME of the MNO. In step 1014 the relay device 112 generates and sends signals (1015, . . . , 1017) to the MNO base stations (MNO base station 1 106, . . . , MNO base station N 108), communicating the SPIDs 1012, to each of the MNO base stations in the MNO network 102. In step 1016, MNO base station 1 106 receives message(s) 1015, recovers the communicated SPIDs 1012 and stores the recovered SPIDs. In step 1018, MNO base station N 108 receives message(s) 1017, recovers the communicated SPIDs 1012 and stores the recovered SPIDs.

Figure 10:
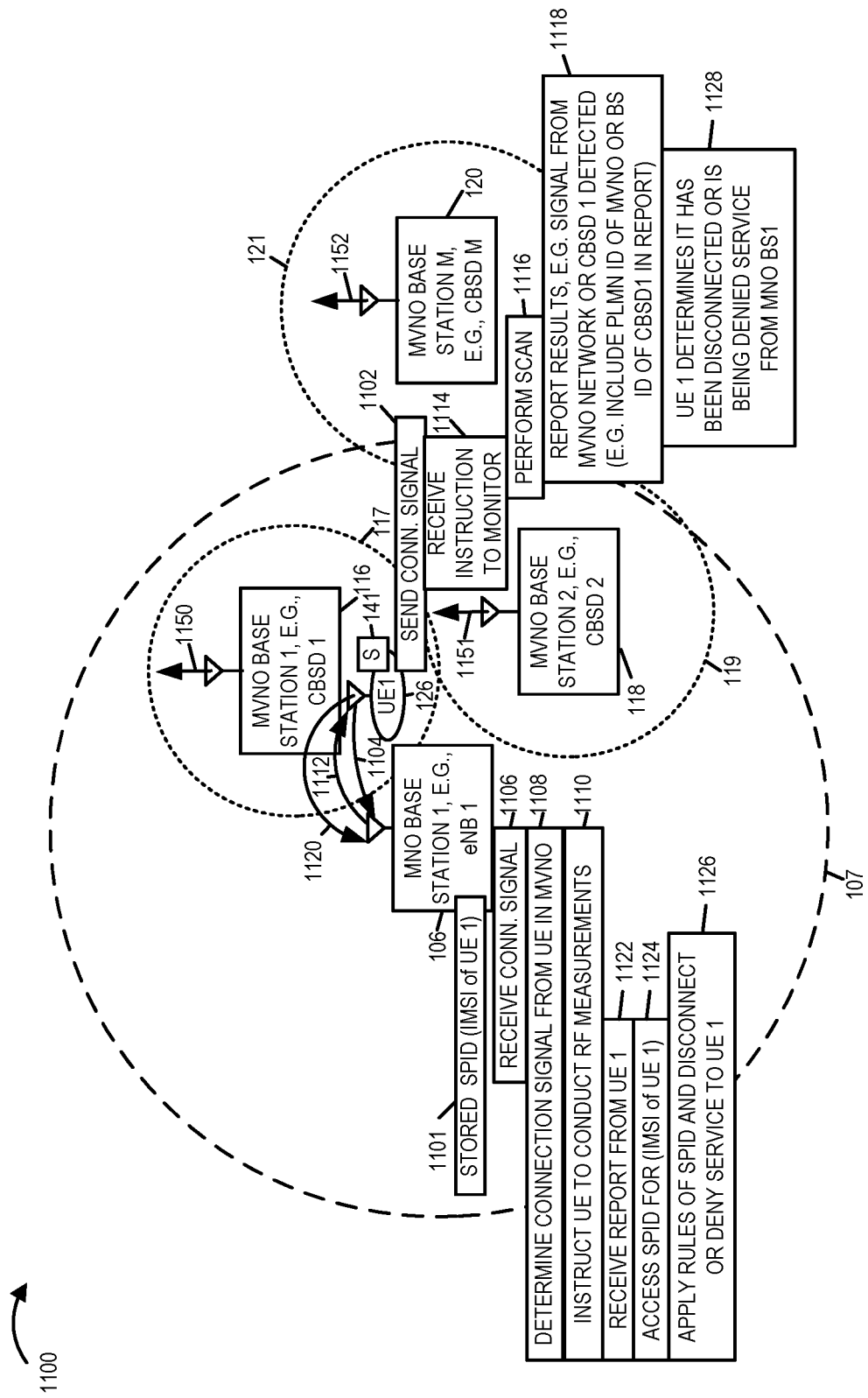
FIG. 10 is a drawing illustrating an exemplary UE, which subscribes to MVNO service, trying to connect to a MNO base station in the exemplary system of FIG. 1, in accordance with an exemplary embodiment.

FIG. 10 is a drawing 1100 illustrating an exemplary UE (UE 1 126), which subscribes to MVNO service, trying to connect to a MNO base station in the exemplary system 100 of FIG. 1, in accordance with an exemplary embodiment. The attempt to connect to the MNO base station may, and sometimes does, occur after connection to an MVNO base station degrades or is lost due to motion of the UE, interference such as a moving vehicle blocking reception or some other potentially transient interference with signals to and/or from an MVNO base station. In such a case, even if the MVNO base station can be detected the interference or channel conditions might not be sufficient to allow for a connection with the MVNO base station to be maintained or established triggering an attempt to connect to a base station which can result in the MNO base station 106 being contacted in an attempt to establish a connection that can be used to maintain a communications session, e.g., call or data transfer session to another device via a base station. The loss of the ability to maintain a connection with the MVNO base station may and often is short lived, e.g., on the order of a few to 30 seconds. In such cases, changing conditions such as movement of the UE 126 or an obstruction may make it possible for the UE to establish a sustainable connection an MVNO base station in a relatively short amount of time. This is particularly the case where the UE can detect the presence of one or more MVNO base stations, indicating that they are nearby, even if the signal strength is not sufficient at the time of detecting their signals to establish a connection. If a connection with an MNO base station is established under such conditions, the UE is likely to remain attached to the MNO base station with its relatively large coverage area for an extended period of time rather than terminate the connection with the MNO base station and reconnect to the MVNO base station. The methods described herein control MNO base station behavior to prevent such connections and encourage connection to an MVNO base station by the MNO base station denying or terminating a connection to a UE when the UE can detect a signal from an MVNO base station corresponding to a service provider associated with the UE. In response to denial or termination of a connection to the MNO base station, the UE will search for base stations which are available and, because MVNO base stations are given a higher connection preference by the UE attached to an MVNO base station if a satisfactory connection can be established before retrying to connect to the MNO base station. In cases where the UE does not detect any MVNO base stations a connection to the MNO base station will be established. Thus, in accordance with various features, an MNO connection will be established when a UE moves out of signal detection range of a MVNO base station but while in signal detection range of an MVNO base station from which it would normally receive service will be denied the MNO connection with the expectation that a connection with the MVNO base station will be possible due to changes in channel conditions or UE movement within a short amount of time.

Referring once again to FIG. 10, MNO base station 106 includes in its memory a stored SPID 1101 for UE 1, which subscribes to the MVNO network. In step 1102 UE 1 126 generates and sends connection signal 1104 to MNO base station 1 106. In step 1106, MNO base station 106 receives connection signal 1104 (including the IMSI corresponding to UE 1) from UE 1 126 and recovers the communicated information. In step 1108 MNO base station 106 determines that the received connection signal 1104 is from a UE in the MVNO, e.g., based on a match of the IMSI in the received signal to a stored list of IMSIs of UEs in MVNO. In step 1110 the MNO base station 106 instructs UE 1 126 to conduct RF measurements to detect MVNO base stations, e.g., sends UE 1 a message 1112 instructing UE 1 126 to scan for signals from CBSD base stations in its MVNO and report back the results. In step 1114, UE 1 126 receives the instruction message to monitor for RF signals from base stations, and in step 1116 UE 1 126 performs the scan. In this example the scan detects the presence of MVNO base station 1 116, e.g. by detecting broadcast signal 1150 from MVNO base station 1 116. In this example, UE 1 126 failed to detect broadcast signals (1151, 1152) from MVNO base stations (118, 120). In step 1118 UE 1 126 generates and sends a results report 1120 to MNO base station 1 106, said report indicating that a signal was detected from the MVNO network 104 or that a signal was detected from CBSD 1 116 of MVNO network 104. In some embodiments the report 1120 includes a PLMN ID of MVNO 104 or a base station ID of CBSD 1 116. In step 1122 MNO base station 1 106 receives the report 1120 from UE 1 126 and recovers the communicated information, indicating that a signal was received from at least one base station in the MVNO network 104. In step 1124 MNO base station 106 accesses stored SPID 1102 for UE 1. In step 1126 the MNO base station 106 applies rules of the SPID 1101 and disconnects or denies service to UE 1 1126. In step 1128 UE 1 126 determines that it has been disconnected or is being denied service from MNO base station 1 106.

Figure 11:
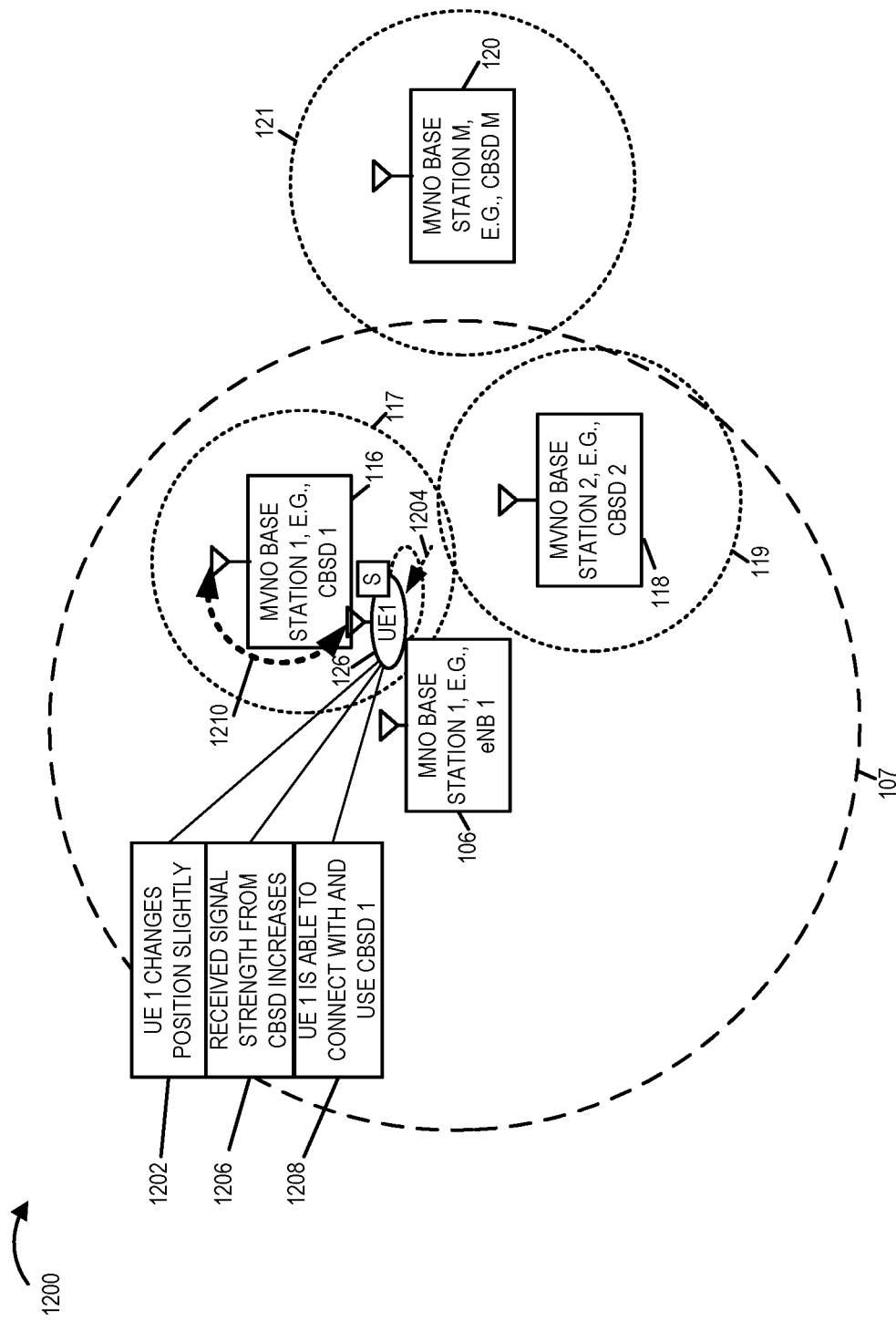
FIG. 11, which is a continuation of the example of FIG. 10, is a drawing illustrating an exemplary UE trying to connect to a base station following being rejected by MNO base station, in accordance with an exemplary embodiment.

FIG. 11 is a continuation of the example of FIG. 10. FIG. 11 is a drawing 1200 illustrating exemplary UE 1 126 trying to connect to a base station following being rejected by MNO base station 106. In step 1202 UE 1 126 has changed its position slightly as indicated by arrow 1204. In step 1206 the received signal strength of signals from CBSD 1 116, as measured at the current location of UE 1 126, increases, making it feasible for UE 1 126 to use MVNO base station 1 116 as a point of access (attachment point) for supporting communications includes communicating traffic signals. In step 1208 UE 1 126 is able to connect with and uses MVNO base station 1 116 for its point of network attachment, as indicated by bi-directional arrow 1210 between MVNO base station 1 116 and UE 1 126.

Numbered List of Exemplary Method Embodiments:

Method Embodiment 1 A communications method, the method comprising: operating (250) a first Mobile Network Operator (MNO) base station (e.g., a first eNB) to instruct (e.g., after determining the that first UE is a first MVNO (Mobile Virtual Network Operator) service provider UE), a first user equipment UE which receives services from a first Mobile Virtual Network operator (MVNO) network to monitor to detect signals (e.g., perform RF signal detection and monitoring operations to detect a network identifier (PLMNID) and/or base station identifier (BSID) signals) transmitted by base stations (MNO base stations and/or MVNO base stations including possibly CBSD base stations); determining (256), at the first MNO base station, from RF signal information received from the first UE, whether a signal from a base station in the first MVNO network was detected by the first UE; when it is determined (262) that the first UE detected a signal from a base station in the first MVNO network, applying (266) at the first MNO base station one or more rules included in a first Service Profile Identifier (SPID) record corresponding to the first UE, said applying of the one or more rules causing the first MNO base station to disconnect or deny service to (e.g., decline to provide service) the first UE; and when it is determined (264) that the first UE did not detect a signal from a base station in the first MVNO network, providing (270) communication service to the first UE via the first MNO base station.

Method Embodiment 2 The method of Method Embodiment 1, further comprising: storing (226) in the first MNO (mobile network operator) base station (e.g., MNO first eNB) SPID records (Service Profile Identifier (SPID) is a number that identifies the services and features to be provided to a device and with which a record including service information and rules is associated) for UE devices which receive services from the first MVNO, the first SPID record being one of said SPID records.

Method Embodiment 3 The method of Method Embodiment 2, further comprising: receiving (230) at the first MNO base station, prior to instructing (250) the first UE, a connection signal from a first UE, said first UE having a first IMSI.

Method Embodiment 4 The method of Method Embodiment 3, further comprising: checking (232), at the first MNO base station if the first UE is a UE corresponding the first MVNO network (e.g., compare (234) first IMSI of the first UE to IMSIs of devices subscribing to service from the first MVNO); and wherein said step of operating (250) the first MNO to instruct (114) a first UE which receives services from a first MVNO to monitor to detect signals is performed in response to determining (238) that the first UE corresponds to the first MVNO network.

Method Embodiment 5 The method of Method Embodiment 1, further comprising: receiving (274), at the first MNO base station, a signal from a second UE with a second IMSI; operating (290) the first MNO base station to provide service to the second UE without requesting the second UE to monitor to detect signals, in response to determining (284) that the second IMSI does not correspond to the first MVNO.

Method Embodiment 6 The method of Method Embodiment 3, further comprising: operating (252) the first MNO base station to receive RF signal information from the first UE, wherein receiving (252) RF signal information from the first UE includes receiving (254) one or more of: i) a network identifier (e.g., a PLMNID) or ii) base station identifier information in one or more signals received from the first UE (optionally received signal strength information (e.g., RSSI) may also be received with the identification information).

Method Embodiment 7 The method of Method Embodiment 3, wherein determining (256), from RF signal information received from the first UE, whether a signal from a base station in the first MVNO network was detected by the first UE includes: determining (258) if the first UE detected a signal from a Citizens Broadband Radio Service (CBRS) network device corresponding to the first MVNO; and determining (262) a signal from a base station in the first MVNO network was detected by the first UE was detected when a signal from a CBRS network device corresponding to the first MVNO is indicated to have been received by the first UE: and determining (264) that a signal from a base station in the first MVNO network was not detected by the first UE when a signal from a CBRS network device corresponding to the first MVNO is not indicated in the received signal information to have been received by the first UE.

Method Embodiment 8 The method of Method Embodiment 3, further comprising: operating (210) a Home Subscriber Server (HSS) device in the first MVNO network to provide IMSI information indicating IMSIs of subscriber devices which subscribe to first MVNO service to a second HSS device in the MNO, said first MVNO network being a partner to the MNO network.

Method Embodiment 9 The method of Method Embodiment 8, further comprising: operating (212) the second HSS device to generate SPID records for subscriber devices which subscribe to first MVNO service, each SPID record corresponding to an IMSI of a device identified to the second HSS device by the first HSS device; and operating (214) the second HSS to send the generated SPID records to a relay device (e.g. a MME (Mobility Management Entity)) in the MNO network for distribution to base stations in the MNO network.

Method Embodiment 10 The method of Method Embodiment 9, wherein said first SPID records is one of the SPID records generated by the second HSS.

Numbered List of Exemplary System Embodiments:

System Embodiment 1 A communications system (100) comprising: a first Mobile Network Operator (MNO) base station (106 or 400) including: a first processor (402) configured to: operating (250) the first MNO base station (e.g., a first eNB) to instruct (e.g., after determining the that first UE is a first MVNO (Mobile Virtual Network Operator) service provider UE), a first user equipment UE which receives services from a first Mobile Virtual Network operator (MVNO) network to monitor to detect signals (e.g., perform RF signal detection and monitoring operations to detect a network identifier (PLMNID) and/or BSID signals) transmitted by base stations (MNO base stations and/or MVNO base stations including possibly CBSD base stations); determine (256), at the first MNO base station, from RF signal information received from the first UE, whether a signal from a base station in the first MVNO network was detected by the first UE; when it is determined (262) that the first UE detected a signal from a base station in the first MVNO network, applying (266) at the first MNO base station one or more rules included in a first Service Profile Identifier (SPID) record corresponding to the first UE, said applying of the one or more rules causing the first MNO base station to disconnect or deny service to (e.g., decline to provide service) the first UE; and when it is determined (264) that the first UE did not detect a signal from a base station in the first MVNO network, providing (270) communication service to the first UE via the first MNO base station.

System Embodiment 2 The communications system (100) of System Embodiment 1, wherein said first processor (402) is further configured to: operate the first MNO base station to store (226) in the first MNO (mobile network operator) base station (e.g., MNO first eNB) SPID records (Service Profile Identifier (SPID) is a number that identifies the services and features to be provided to a device and with which a record including service information and rules is associated) for UE devices which receive services from the first MVNO, the first SPID record being one of said SPID records.

System Embodiment 3 The communications system (100) of System Embodiment 2, wherein said first MNO base station further includes: a first wireless receiver (412); and wherein said first processor (402) is further configured to: operate the first MNO base station to receive (230) at the first MNO base station, prior to instructing (250) the first UE, a connection signal from a first UE, said first UE having a first IMSI.

System Embodiment 4 The communications system (100) of System Embodiment 3, wherein said first processor (402) is further configured to: check (232), at the first MNO base station if the first UE is a UE corresponding the first MVNO network (e.g., compare (234) first IMSI of the first UE to IMSIs of devices subscribing to service from the first MVNO); and wherein said step of operating (250) the first MNO to instruct (114) a first UE which receives services from a first MVNO to monitor to detect signals is performed in response to determining (238) that the first UE corresponds to the first MVNO network.

System Embodiment 5 The communications system (100) of System Embodiment 1, wherein said first processor (402) is further configured to: operate the first wireless receiver to receive (274), at the first MNO base station, a signal from a second UE with a second IMSI; operating (290) the first MNO base station to provide service to the second UE without requesting the second UE to monitor to detect signals, in response to determining (284) that the second IMSI does not correspond to the first MVNO.

System Embodiment 6 The communications system (100) of System Embodiment 3, wherein said first processor (402) is further configured to: operate (252) the first wireless receiver (412) of the first MNO base station to receive RF signal information from the first UE, wherein receiving (252) RF signal information from the first UE includes receiving (254) one or more of: i) a network identifier (e.g., a PLMNID) or ii) base station identifier information in one or more signals received from the first UE (optionally received signal strength information (e.g., RSSI) may also be received with the identification information).

System Embodiment 7 The communications system (100) of System Embodiment 3, wherein said first processor (402) is configured to: determine (258) if the first UE detected a signal from a Citizens Broadband Radio Service (CBRS) network device corresponding to the first MVNO; determine (262) a signal from a base station in the first MVNO network was detected by the first UE was detected when a signal from a CBRS network device corresponding to the first MVNO is indicated to have been received by the first UE; and determine (264) that a signal from a base station in the first MVNO network was not detected by the first UE when a signal from a CBRS network device corresponding to the first MVNO is not indicated in the received signal information to have been received by the first UE, as part of being configured to determine (256), from RF signal information received from the first UE, whether a signal from a base station in the first MVNO network was detected by the first UE.

System Embodiment 8 The communications system (100) of System Embodiment 3, further comprising a first Home Subscriber Server (HSS) device (122) in the first MVNO network (104), said first HSS device (122) including: a second processor (602 of HSS 122) configured to operate the first HSS device (122) to provide IMSI information indicating IMSIs of subscriber devices which subscribe to first MVNO service to a second HSS device (110) in the MNO (102), said first MVNO network (104) being a partner to the MNO network (102).

System Embodiment 9 The communications system (100) of System Embodiment 8, further comprising said second HSS device (110), said second HSS device (110) including a third processor (602 of 110) configured to: operate (212) the second HSS device (110) to generate SPID records for subscriber devices which subscribe to first MVNO service, each SPID record corresponding to an IMSI of a device identified to the second HSS device (110) by the first HSS device (122); and operate (214) the second HSS (110) to send the generated SPID records to a relay device (112) (e.g. a MME (Mobility Management Entity)) in the MNO network (102) for distribution to base stations (106, 108) in the MNO network (102).

System Embodiment 10 The communications system (100) of System Embodiment 9, wherein said first SPID records is one of the SPID records generated by the second HSS (110).

Numbered List of Exemplary Non-Transitory Computer Readable Medium Embodiments:

Non-Transitory Computer Readable Medium Embodiment 1 A non-transitory computer readable medium (410) including computer executable instructions which when executed by a processor (402) of a first Mobile Node Operator (MNO) base station (e.g., first eNB) (106 or 400) cause the first MNO base station (106 or 400) to perform the steps of: operating (250) the first MNO base station (106 or 400) to instruct (250) (e.g., after determining the that first UE (UE 1 126, UE 2 128, or UE 3 130) is a first MVNO (Mobile Virtual Network Operator) service provider UE), a first user equipment UE (UE 1 126, UE 2 128, or UE 3 130) which receives services from a first Mobile Virtual Network operator (MVNO) network (104) to monitor to detect signals (e.g., perform RF signal detection and monitoring operations to detect a network identifier (PLMNID) and/or BSID signals) transmitted by base stations (MNO base stations and/or MVNO base stations including possibly CBSD base stations); determining (256), at the first MNO base station (106 or 400), from RF signal information received from the first UE (UE 1 126, UE 2 128, or UE 3 130), whether a signal from a base station (MVNO BS 1 116, MVNO BS 2 118, or MVNO BS M 120) in the first MVNO network (104) was detected by the first UE (UE 1 126, UE 2 128, or UE 3 130); when it is determined (262) that the first UE (UE 1 126 or UE 3 130) detected a signal from a base station (116 or 118) in the first MVNO network (104), applying (266) at the first MNO base station (106) one or more rules included in a first Service Profile Identifier (SPID) record corresponding to the first UE (126 or 130), said applying of the one or more rules causing the first MNO base station (106) to disconnect or deny service to (e.g., decline to provide service) the first UE (126 or 130); and when it is determined (264) that the first UE (UE 2 128) did not detect a signal from a base station (116, 118, 120) in the first MVNO network, providing (270) communication service to the first UE (128) via the first MNO base station (106).

Various embodiments are directed to apparatus, e.g., user devices such as a user equipment (UE) device, MNO base stations (macro cell base stations and small cell base stations) such as a eNB, gNB or ng-eNB, MVNO base stations such as CBSDs, network nodes, MNO and MVNO HSS devices, relay devices, e.g. MMEs, a SAS, an AMF device, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, base stations, e.g., eNB and CBSDs, gateways, servers (HSS server), MMEs, SAS, cable networks, cloud networks, nodes, servers, cloud service servers, customer premises equipment devices, controllers, network monitoring nodes/servers and/or cable or network equipment devices. Various embodiments are directed to communications network which are partners, e.g. a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a MVNO base station such as a CBRS base station, e.g. a CBSD, an device such as a cellular base station e.g., an eNB, a MNO HSS server, a MVNO HSS server, a UE device, a relay device, e.g a MME, SAS, etc., said device including a processor configured to implement one, multiple or all of the steps of one or more methods of the invention.

In some embodiments, the processor or processors, e.g., CPUs, of one or more devices, e.g., communications nodes such as e.g., a MVNO base station such as a CBRS base station, e.g. a CBSD, an device such as a cellular base station e.g., an eNB, a MNO HSS server, a MVNO HSS device server, a UE device, a relay device, e.g a MME, a SAS, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as e.g., a MVNO base station such as a CBRS base station, e.g. a CBSD, an device such as a cellular base station e.g., an eNB, a MNO HSS server, a MVNO HSS device server, a UE device, a relay device, e.g a MME, includes a component corresponding to each of one or more of the steps of the various described methods performed by the device in which the processor is included. In some but not all embodiments a device, e.g., as e.g., a MVNO base station such as a CBRS base station, e.g. a CBSD, an device such as a cellular base station e.g., an eNB, a MNO HSS server, a MVNO HSS device server, a UE device, a relay device, e.g a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a MNVO base station, e.g. a CBSD, a MNO cellular base station, e.g., an eNB or a gNB, a HSS server, a UE device, a SAS or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
operating a first Mobile Network Operator (MNO) base station to instruct a first user equipment (UE) which receives services from a first Mobile Virtual Network Operator (MVNO) network to monitor to detect signals transmitted by base stations;
determining, at the first MNO base station, from RF signal information received from the first UE, whether a signal from a base station in the first MVNO network was detected by the first UE;
when it is determined that the first UE detected a signal from a base station in the first MVNO network, applying at the first MNO base station one or more rules included in a first Service Profile Identifier (SPID) record corresponding to the first UE, said applying of the one or more rules causing the first MNO base station to disconnect or deny service to the first UE; and
when it is determined that the first UE did not detect a signal from a base station in the first MVNO network, providing communication service to the first UE via the first MNO base station.

2. The method of claim 1, further comprising:
storing in the first MNO base station SPID records for UE devices which receive services from the first MVNO, the first SPID record being one of said SPID records.

3. The method of claim 2, further comprising:
receiving at the first MNO base station, prior to instructing the first UE, a connection signal from the first UE, said first UE having a first IMSI.

4. The method of claim 3, further comprising:
checking, at the first MNO base station if the first UE is a UE corresponding the first MVNO network; and
wherein said step of operating the first MNO to instruct a first UE which receives services from a first MVNO to monitor to detect signals is performed in response to determining that the first UE corresponds to the first MVNO network.

5. The method of claim 1, further comprising:
receiving, at the first MNO base station, a signal from a second UE with a second IMSI;
operating the first MNO base station to provide service to the second UE without requesting the second UE to monitor to detect signals, in response to determining that the second IMSI does not correspond to the first MVNO network.

6. The method of claim 3, further comprising:
operating the first MNO base station to receive RF signal information from the first UE, wherein receiving RF signal information from the first UE includes receiving one or more of: i) a network identifier or ii) base station identifier information in one or more signals received from the first UE.

7. The method of claim 3, wherein determining, from RF signal information received from the first UE, whether a signal from a base station in the first MVNO network was detected by the first UE includes:
determining if the first UE detected a signal from a Citizens Broadband Radio Service (CBRS) network device corresponding to the first MVNO; and
determining a signal from a base station in the first MVNO network was detected by the first UE was detected when a signal from a CBRS network device corresponding to the first MVNO is indicated to have been received by the first UE: and
determining that a signal from a base station in the first MVNO network was not detected by the first UE when a signal from a CBRS network device corresponding to the first MVNO is not indicated in the received signal information to have been received by the first UE.

8. The method of claim 3, further comprising:
operating a Home Subscriber Server (HSS) device in the first MVNO network to provide IMSI information indicating IMSIs of subscriber devices which subscribe to first MVNO service to a second HSS device in the MNO network, said first MVNO network being a partner to the first MNO network.

9. The method of claim 8, further comprising:
operating the second HSS device to generate SPID records for subscriber devices which subscribe to first MVNO service, each SPID record corresponding to an IMSI of a device identified to the second HSS device by the first HSS device; and
operating the second HSS device to send the generated SPID records to a relay device in the MNO network for distribution to base stations in the first MNO network.

10. The method of claim 9, wherein said first SPID record is one of the SPID records generated by the second HSS device.

11. A communications system comprising:
a first Mobile Network Operator (MNO) base station including:
a first processor configured to:
operating the first MNO base station to instruct a first user equipment (UE) which receives services from a first Mobile Virtual Network Operator (MVNO) network to monitor to detect signals transmitted by base stations;
determine, at the first MNO base station, from RF signal information received from the first UE, whether a signal from a base station in the first MVNO network was detected by the first UE;
when it is determined that the first UE detected a signal from a base station in the first MVNO network, applying at the first MNO base station one or more rules included in a first Service Profile Identifier (SPID) record corresponding to the first UE, said applying of the one or more rules causing the first MNO base station to disconnect or deny service to the first UE; and
when it is determined that the first UE did not detect a signal from a base station in the first MVNO network, providing communication service to the first UE via the first MNO base station.

12. The communications system of claim 11, wherein said first processor is further configured to:
operate the first MNO base station to store in the first MNO base station SPID records for UE devices which receive services from the first MVNO, the first SPID record being one of said SPID records.

13. The communications system of claim 12, wherein said first MNO base station further includes:
a first wireless receiver; and
wherein said first processor is further configured to:
operate the first MNO base station to receive at the first MNO base station, prior to instructing the first UE, a connection signal from the first UE, said first UE having a first IMSI.

14. The communications system of claim 13, wherein said first processor is further configured to:
check, at the first MNO base station if the first UE is a UE corresponding the first MVNO network; and
wherein said step of operating the first MNO to instruct a first UE which receives services from a first MVNO to monitor to detect signals is performed in response to determining that the first UE corresponds to the first MVNO network.

15. The communications system of claim 11, wherein said first processor is further configured to:
operate the first wireless receiver to receive, at the first MNO base station, a signal from a second UE with a second IMSI;
operating the first MNO base station to provide service to the second UE without requesting the second UE to monitor to detect signals, in response to determining that the second IMSI does not correspond to the first MVNO network.

16. The communications system of claim 13, wherein said first processor is further configured to:
operate the first wireless receiver of the first MNO base station to receive RF signal information from the first UE, wherein receiving RF signal information from the first UE includes receiving one or more of: i) a network identifier or ii) base station identifier information in one or more signals received from the first UE.

17. The communications system of claim 13, wherein said first processor is configured to:
determine if the first UE detected a signal from a Citizens Broadband Radio Service (CBRS) network device corresponding to the first MVNO;
determine a signal from a base station in the first MVNO network was detected by the first UE was detected when a signal from a CBRS network device corresponding to the first MVNO is indicated to have been received by the first UE; and
determine that a signal from a base station in the first MVNO network was not detected by the first UE when a signal from a CBRS network device corresponding to the first MVNO is not indicated in the received signal information to have been received by the first UE,
as part of being configured to determine, from RF signal information received from the first UE, whether a signal from a base station in the first MVNO network was detected by the first UE.

18. The communications system of claim 13, further comprising a first Home Subscriber Server (HSS) device in the first MVNO network, said first HSS device including:
a second processor configured to operate the first HSS device to provide IMSI information indicating IMSIs of subscriber devices which subscribe to first MVNO service to a second HSS device in the MNO, said first MVNO network being a partner to the first MNO network.

19. The communications system of claim 18, further comprising said second HSS device, said second HSS device including a third processor configured to:
operate the second HSS device to generate SPID records for subscriber devices which subscribe to first MVNO service, each SPID record corresponding to an IMSI of a device identified to the second HSS device by the first HSS device; and
operate the second HSS device to send the generated SPID records to a relay device in the first MNO network for distribution to base stations in the first MNO network.

20. A non-transitory computer readable medium including computer executable instructions which when executed by a processor of a first Mobile Node Network Operator (MNO) base station cause the first MNO base station to perform the steps of:
operating the first MNO base station to instruct a first user equipment (UE) which receives services from a first Mobile Virtual Network Operator (MVNO) network to monitor to detect signals transmitted by base stations;
determining, at the first MNO base station, from RF signal information received from the first UE, whether a signal from a base station in the first MVNO network was detected by the first UE;
when it is determined that the first UE detected a signal from a base station in the first MVNO network, applying at the first MNO base station one or more rules included in a first Service Profile Identifier (SPID) record corresponding to the first UE, said applying of the one or more rules causing the first MNO base station to disconnect or deny service to the first UE; and
when it is determined that the first UE did not detect a signal from a base station in the first MVNO network, providing communication service to the first UE via the first MNO base station.

* * * * *